(12) United States Patent
    Lindsey

(10) Patent No.: US 11,138,706 B2
(45) Date of Patent: Oct. 5, 2021

(54) VORONOI CROPPING OF IMAGES FOR POST FIELD GENERATION

(71) Applicant: AeroVironment, Inc., Simi Valley, CA (US)

(72) Inventor: Quentin Lindsey, Canoga Park, CA (US)

(73) Assignee: AEROVIRONMENT, INC., Arlington, VA (US)

(*) Notice: Subject to any disclaimer, the term of this patent is extended or adjusted under 35 U.S.C. 154(b) by 0 days.

(21) Appl. No.: 16/258,034

(22) Filed: Jan. 25, 2019

(65) Prior Publication Data

US 2019/0236764 A1    Aug. 1, 2019

Related U.S. Application Data

(60) Provisional application No. 62/622,654, filed on Jan. 26, 2018.

(51) Int. Cl.
| | |
|---|---|
| *G06T 5/50* | (2006.01) |
| *G06K 9/00* | (2006.01) |
| *G06T 7/11* | (2017.01) |
| *G06T 7/174* | (2017.01) |
| *B64C 39/02* | (2006.01) |
| *G06T 3/40* | (2006.01) |

(52) U.S. Cl.
CPC .............. *G06T 5/50* (2013.01); *B64C 39/024* (2013.01); *G06K 9/0063* (2013.01); *G06T 3/4038* (2013.01); *G06T 7/11* (2017.01); *G06T 7/174* (2017.01); *B64C 2201/123* (2013.01); *B64C 2201/127* (2013.01); *G06T 2207/10032* (2013.01); *G06T 2207/20221* (2013.01)

(58) Field of Classification Search
CPC ... G06T 5/50; G06T 7/11; G06T 7/174; G06T 2207/20221; G06T 2207/10032; B64C 39/024; B64C 2201/123; B64C 2201/127; G06K 9/0063
USPC ......................................................... 382/254
See application file for complete search history.

(56) References Cited

U.S. PATENT DOCUMENTS

| | | | | |
|---|---|---|---|---|
| 6,392,647 | B1* | 5/2002 | Migdal | .................. G06T 17/20 345/423 |
| 10,140,651 | B1* | 11/2018 | Mishra | ................. G06F 3/04845 |
| 2002/0008697 | A1* | 1/2002 | Deering | ................... G06T 5/006 345/418 |
| 2005/0190991 | A1 | 9/2005 | McCleese | |
| 2007/0116357 | A1 | 5/2007 | Dewaele | |
| 2012/0050525 | A1 | 3/2012 | Rinner et al. | |
| 2013/0317667 | A1* | 11/2013 | Kruglick | ............... B64C 39/024 701/2 |

(Continued)

OTHER PUBLICATIONS

International Search Report and Written Opinion for PCT/US19/15207, dated Apr. 29, 2019.

*Primary Examiner* — Jerome Grant, II
(74) *Attorney, Agent, or Firm* — Concept IP LLP; Pejman Yedidsion; Eric Aagard

(57) ABSTRACT

A method and system including: defining a geographic area; receiving a plurality of images; determining a plurality of image points; partitioning the geographic area into a plurality of image regions based on the plurality of image points; and stitching the plurality of images into a combined image based on the plurality of image regions.

20 Claims, 21 Drawing Sheets

(56) References Cited

U.S. PATENT DOCUMENTS

| | | | |
|---|---|---|---|
| 2013/0335506 A1* | 12/2013 | Carter | H04N 7/15 |
| | | | 348/14.07 |
| 2015/0192705 A1* | 7/2015 | Nimura | G03B 13/24 |
| | | | 359/621 |
| 2016/0088287 A1 | 3/2016 | Sadi et al. | |
| 2016/0217582 A1* | 7/2016 | Sasaki | G06K 9/2081 |
| 2017/0032524 A1* | 2/2017 | Dickrell, III | G06T 7/0014 |
| 2017/0094098 A1* | 3/2017 | Manda | H04N 1/2338 |
| 2017/0124745 A1* | 5/2017 | Christ | G01C 11/04 |
| 2017/0346993 A1* | 11/2017 | Manda | H04N 1/00023 |
| 2018/0373931 A1* | 12/2018 | Li | G06K 9/00637 |
| 2019/0102897 A1* | 4/2019 | Lewis | G06F 16/532 |
| 2019/0130228 A1* | 5/2019 | Fu | G06N 20/00 |
| 2019/0158011 A1* | 5/2019 | West | H02S 10/20 |

\* cited by examiner

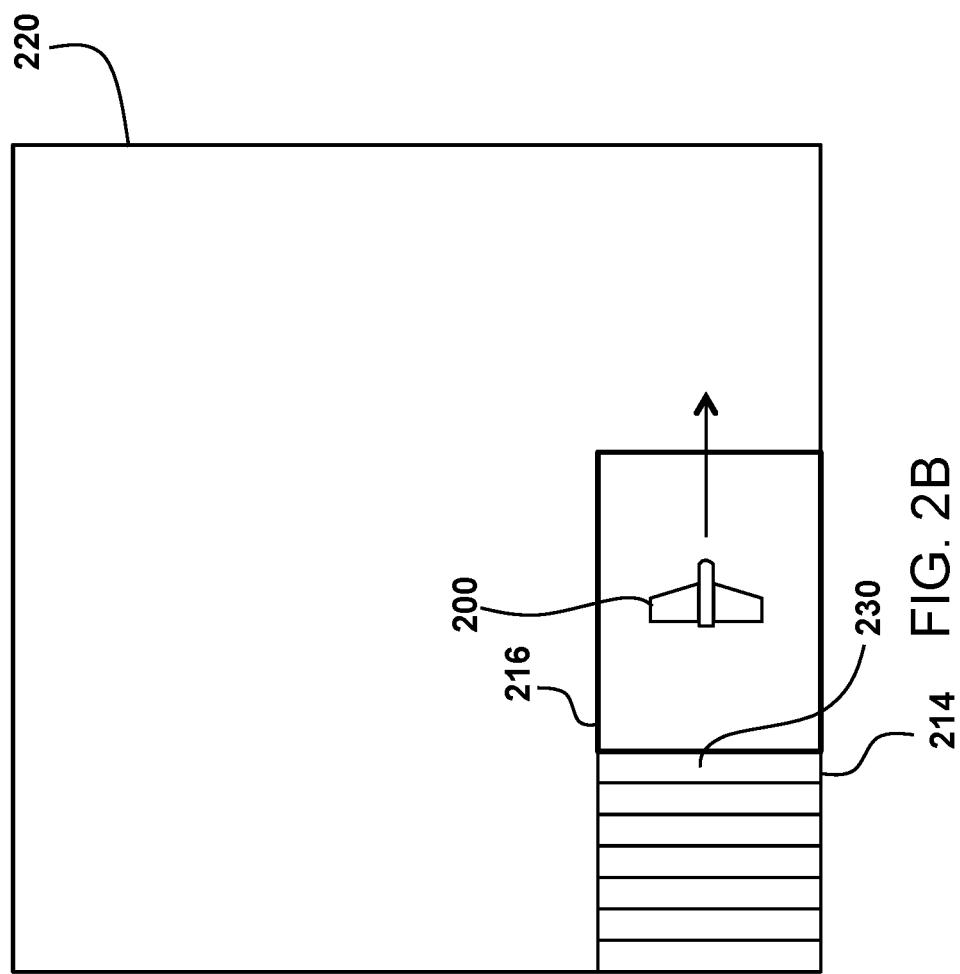

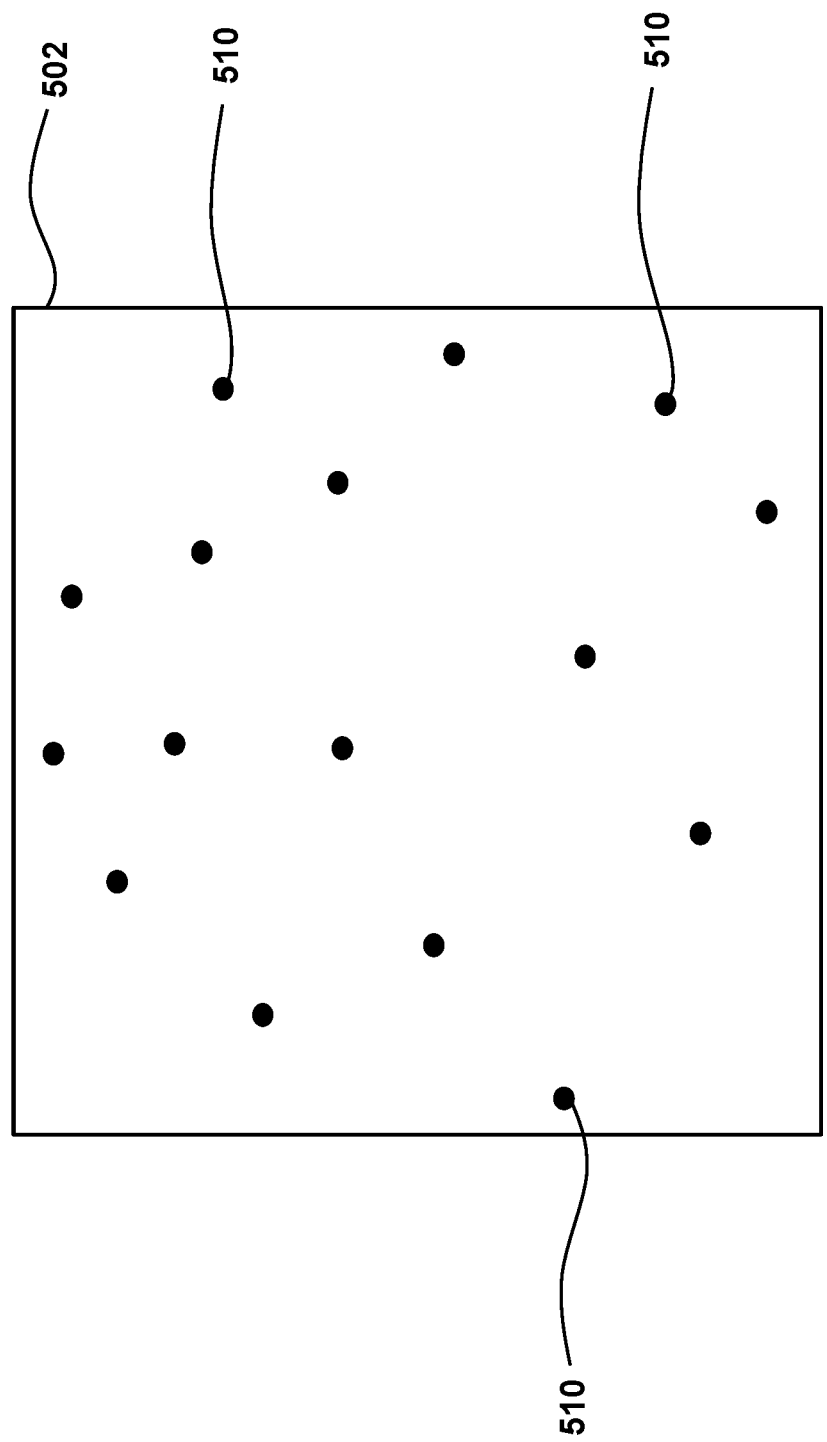

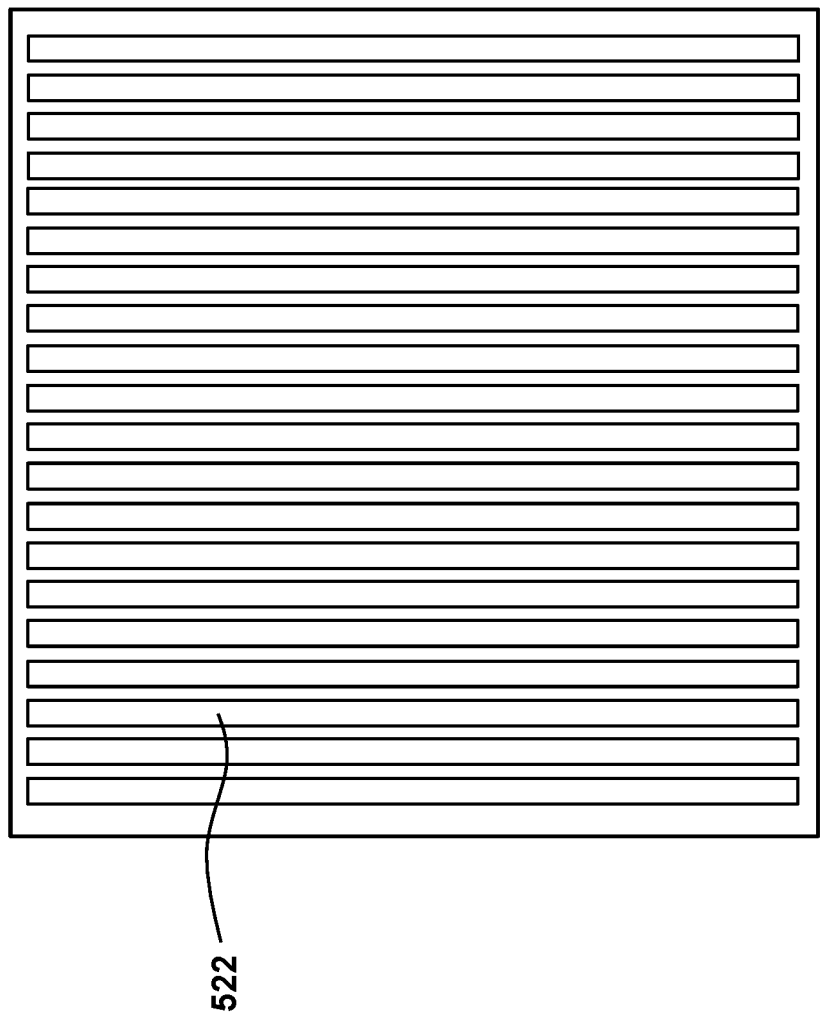

VORONOI CROPPING OF IMAGES FOR POST FIELD GENERATION

CROSS-REFERENCE TO RELATED APPLICATIONS

This application claims priority to and the benefit of U.S. Provisional Patent Application No. 62/622,654, filed Jan. 26, 2018, the contents of which are hereby incorporated by reference herein for all purposes.

FIELD OF ENDEAVOR

The invention, in its several embodiments, pertains to image stitching, and more particularly to image stitching of aerial images.

BACKGROUND

Image stitching is the process of combining multiple images with overlapping fields of view to create a combined image. There are numerous ways to combine multiple images. Some of these combinations may result in distortion, visual artifacts, visible seams, alignment issues, etc.

SUMMARY

Some embodiments may include a method including: defining a geographic area; receiving a plurality of images, where at least a portion of each received image is within the defined geographic area; determining a plurality of image points, where each image point is a geographic location of a center field of view of each image of the received plurality of images; partitioning the geographic area into a plurality of image regions based on the plurality of image points, where each pixel in each image region is closer to a closest image point of the plurality of image points than any other image point of the plurality of image points; and stitching the plurality of images into a combined image based on the plurality of image regions, where each pixel in the combined image is selected from its corresponding image region.

In additional method embodiments, partitioning the geographic area into the plurality of image regions may further include: generating a Voronoi diagram. Additional method embodiments may include capturing the plurality of images by an aerial vehicle. While any of a variety of air vehicles can be used, in some embodiments, the aerial vehicle may be a vertical takeoff and landing (VTOL) unmanned aerial vehicle (UAV). Likewise, any of a variety of image capture rates can be used, as an example, in at least one embodiment the aerial vehicle captures two pictures per second.

Additional method embodiments may include filtering one or more images of the received plurality of images. Filtering the one or more images may further include removing the one or more images due to at least one of: overexposure, underexposure, distortion, blur, and an error with a camera taking the image. Additional method embodiments may include applying one or more image enhancements to one or more images of the received plurality of images. Applying image enhancements to the one or more images may include at least one of: brightening, darkening, color correcting, white balancing, sharpening, correcting lens distortion, and adjusting contrast.

System embodiments may, for example, include: an unmanned aerial vehicle (UAV) including: a processor having addressable memory; a sensor in communication with the processor, the sensor configured to capture a plurality of images; and a global positioning system (GPS) in communication with the processor; where the processor may be configured to: receive a geographic area; receive a plurality of images from the sensor; partition the geographic area into a plurality of image regions based on the plurality of image points, where each pixel in each image region is closer to a closest image point than any other image point; and stitch the plurality of images into a combined image based on the plurality of image regions, where each pixel in the combined image is selected from its corresponding image region. In some system embodiments, the UAV may further include a global positioning system (GPS) in communication with the processor, where the processor may use the GPS to determine the geographic location of each image point of the plurality of image points.

In additional system embodiments, the processor may be further configured to generate a Voronoi diagram to partition the geographic area into the plurality of image regions. The processor may be configured to capture two images per second via the sensor. The UAV may be a vertical takeoff and landing (VTOL) UAV. In some embodiments, the processor may be further configured to filter one or more images of the received plurality of images, where filtering the one or more images may further include: removing the one or more images due to at least one of: overexposure, underexposure, distortion, blur, and an error with a camera taking the image. In some embodiments, the processor may be further configured to apply one or more image enhancements to one or more images of the received plurality of images, where applying image enhancements to the one or more images may include at least one of: brightening, darkening, color correcting, white balancing, sharpening, correcting lens distortion, and adjusting contrast.

The system may also include a controller including: a processor having addressable memory, where the processor is configured to: define the geographic area; send the geographic area to the UAV; and receive the combined image from the UAV. The system may also include: a computing device comprising a processor and addressable memory, where the processor is configured to: receive the combined image from at least one of: the UAV and the controller; and analyze the combined image. Analyzing the combined image may include comparing the combined image to a historical combined image. Analyzing the combined image may include determining at least one of: crop stress, water issues, and estimated crop yield. The processor of the computing device may be further configured to smooth the combined image to account for at least one of: brightness, color, dead pixels, and lens distortion. The processor of the computing device may be further configured to: receive the plurality of images; and stitch the plurality of images into a high resolution combined image based on the plurality of image regions, where each pixel in the combined image is selected from its corresponding image region.

Additional method embodiments may include: receiving a plurality of images; determining a plurality of image points, where each image point may be a geographic location of a center field of view of each image of the received plurality of images; partitioning the geographic area into a plurality of image regions based on the plurality of image points, where each pixel in each image region is closer to a closest image point of the plurality of image points than any other image point of the plurality of image points; stitching the plurality of images into a combined image based on the plurality of image regions, where each pixel in the combined image is selected from its corresponding image region; and expanding each image region in the combined image by a set amount such that a respective border of each image region overlaps each neighboring image region.

BRIEF DESCRIPTION OF DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 2B depicts a method of combining the plurality of images in FIG. 2A into a combined image;

FIG. 5D depicts the plurality of image points in FIG. 5C;

FIG. 5G depicts a combined image created based on the plurality of image regions in FIGS. 5E-5F;

DETAILED DESCRIPTION

The disclosed system and method allows for the creation of a combined image with minimal distortion from a plurality of images. An aerial vehicle, such as an autonomous vertical take-off and landing (VTOL) unmanned aerial vehicle (UAV), may capture and store a plurality of images along with geographic information on the image field of view and a center location of each image. The aerial vehicle may partition a selected geographic area into a plurality of image regions based on the center location of each image, e.g., a Voronoi diagram. The aerial vehicle, via the disclosed systems and methods, may then stitch the captured and stored images together to form the combined image based on the plurality of image regions. The resulting combined image uses pixels from images closer to the center location of each image, which results in decreased distortion. Accordingly, less expensive lenses and sensors may be used without a reduction in quality, or at least with a minimization of the reduction of quality, of the combined image.

Figure 1A:
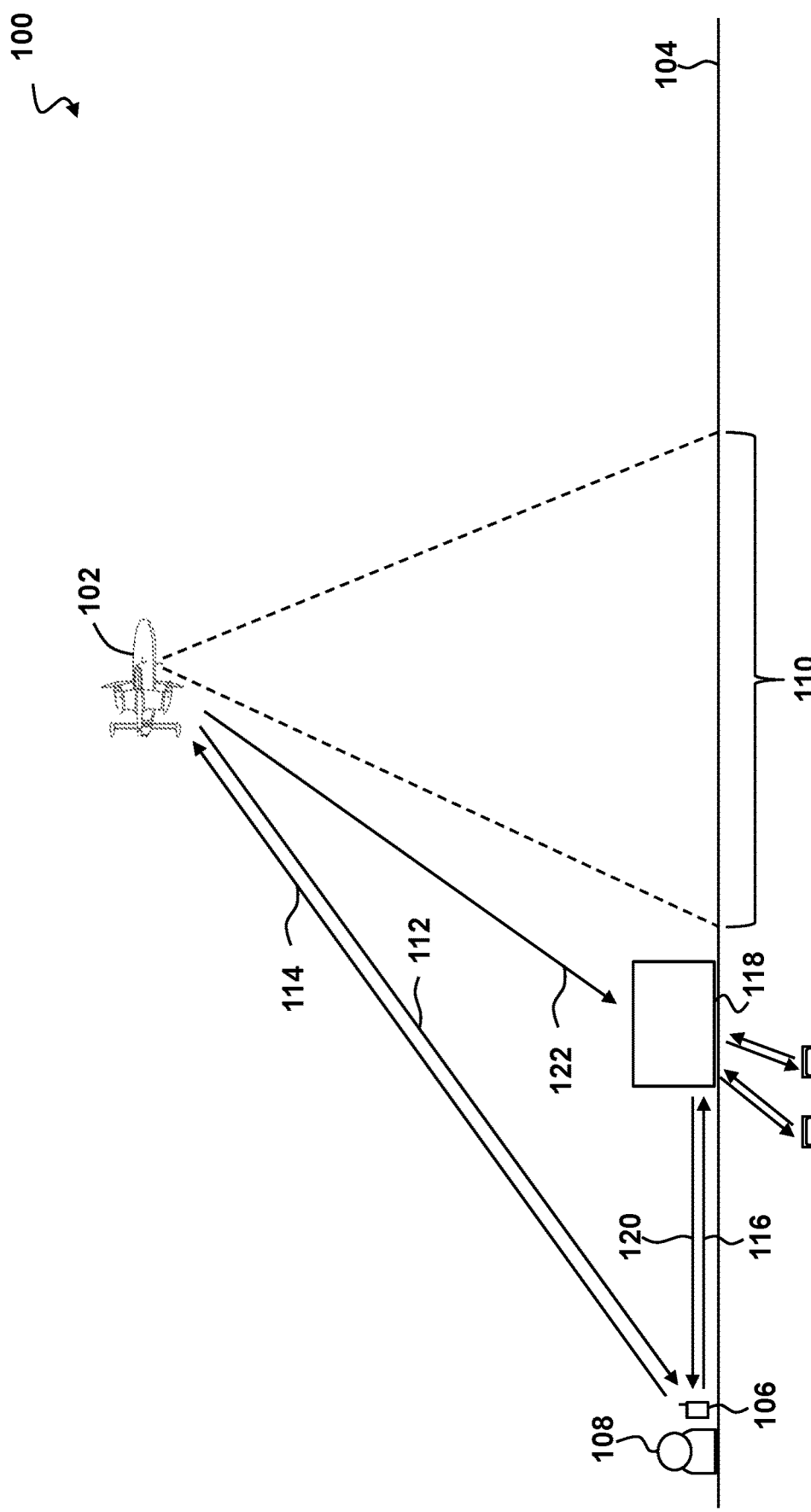
FIG. 1A depicts an exemplary system for generating a combined image from a plurality of images of a geographic area.

FIG. 1A depicts an exemplary system 100 for generating a combined image from a plurality of images of a geographic area. An aerial vehicle 102, such as an autonomous vertical take-off and landing (VTOL) unmanned aerial vehicle (UAV) may receive a flight path covering a defined geographic area of the ground 104 from a controller 106, relative to a local plane. In one embodiment, user 108 may monitor the aerial vehicle 102 via a display of the controller 106. In some embodiments, the aerial vehicle 102 may, for example, follow a flight path from vertical take-off to horizontal flight (not shown). The aerial vehicle 102 may use horizontal flight (via wing-generated lift) to maximize flight time and the area that may be imaged by one or more sensors on the aerial vehicle 102. The user 108 may use the controller 106 to monitor and control the aerial vehicle 102. In another embodiment, images of the area may be obtained from external sources and processed in the same manner as the disclosed methods.

The aerial vehicle 102 may include a processor having addressable memory, a sensor in communication with the processor, a global positioning system (GPS) and/or an inertial measurement unit (IMU) in communication with the processor, and a transceiver in communication with the processor. The sensor may be a camera having a field of view 110 of the ground. The sensor may be used to capture a plurality of images within the defined geographic area on the ground 104. These captured images may be stored by the processor of the aerial vehicle 102 along with geographic information, e.g., via the GPS, relating to the field of view and the center point of each image.

The processor of the aerial vehicle 102 may stitch the stored images together to form a combined image that may be viewed by a user 108 via a display of the controller 106. The controller 106 may determine the geographic location of a center of each stored image. The controller may then partition the geographic area into a plurality of image regions, e.g., a Voronoi diagram, based on the image points. Each pixel in the stitched combined image may be closer to a closest image point than any other point. As a result, since distortion in a camera lens is typically proportional to the distance from the center of the lens, each pixel in the stitched combined image may have the least possible distortion from a lens of the sensor.

The aerial vehicle 102 may transmit 112 the combined image, the stored image, location and/or other sensor or flight data, etc. to the controller 106. The controller 106 may, in turn, transmit 114 a defined geographic area, flight data, flight paths, mission plans, directions, etc. to the aerial vehicle 102. The onboard processor of the aerial vehicle 106 may perform additional analysis on the combined image or stored images, for instance by comparing the combined image to a historical combined image. In embodiments where the aerial vehicle 102 is used for agriculture, its processor may analyze the combined image and/or the stored images to determine crop conditions (e.g., stress, growth stage, height, etc.), water issues, estimated crop yield, etc. The aerial vehicle 102 may also use the onboard processor to perform additional processing to smooth the combined image to account for brightness, color, dead pixels, lens distortion, alignment, etc.

In one example of the embodiments, the controller 106 may transmit 116 the received combined image, the stored image, location and/or other sensor or flight data, etc. to a computing device 118. The computing device 118 may be a machine for performing processing of data, for example, server, network, computer, laptop, tablet, smartphone, cloud computing device, etc. In this embodiment, the computing device 118 may perform additional analysis on the combined image or stored images. This analysis and processing may be in addition to or instead of any processing performed at the aerial vehicle (102). The computing device 118 may analyze the combined image by comparing the combined image to a historical combined image. In embodiments where the aerial vehicle 102 is used for agriculture, the computing device 118 may analyze the combined image and/or the stored images to determine crop conditions (e.g., stress, growth stage, height, etc.), water issues, estimated crop yield, etc. The computing device 118 may also perform additional processing to smooth the combined image to account for brightness, color, dead pixels, lens distortion, alignment, etc.

While in some embodiments either the onboard processor of the air vehicle 102 or the computing device 118 may be used to perform additional processing or analysis on the combined image or stored images, typically it will be done by the onboard processor of the air vehicle 102. This is due to the fact that the data transmissions 114 to the controller and the transmission 116 to the computing device 118 and/or the transmission 122 to the computing device 118 may be of limited bandwidth as to make using the computer device 118 to perform such additional processing time prohibitive. That is, in some situations, the transmission of the raw data from the air vehicle 102 to the computing device 118 may take too long to make the off-site processing practical, as the onboard processor could complete the processing or analysis before all of the data could be transmitted.

The computing device 118 may transmit 120 this processed data and/or analysis to the controller 106 for review by the user 108. In some embodiments, the aerial vehicle 102 may transmit 122 the combined image, stored image, onboard processed data, or other data directly to the computing device 118. In other embodiments, this data may be transferred to the controller 108, stored in a removable memory, e.g., a USB drive, etc.

In some embodiments, the computing device 118 may be accessed by any of a variety of remote terminals 190 or other means (tablets, smartphones, etc.) over the internet to allow additional users to review and analyze the data. That is, multiple users may be given access to view the data from any number of locations.

Figure 1B:
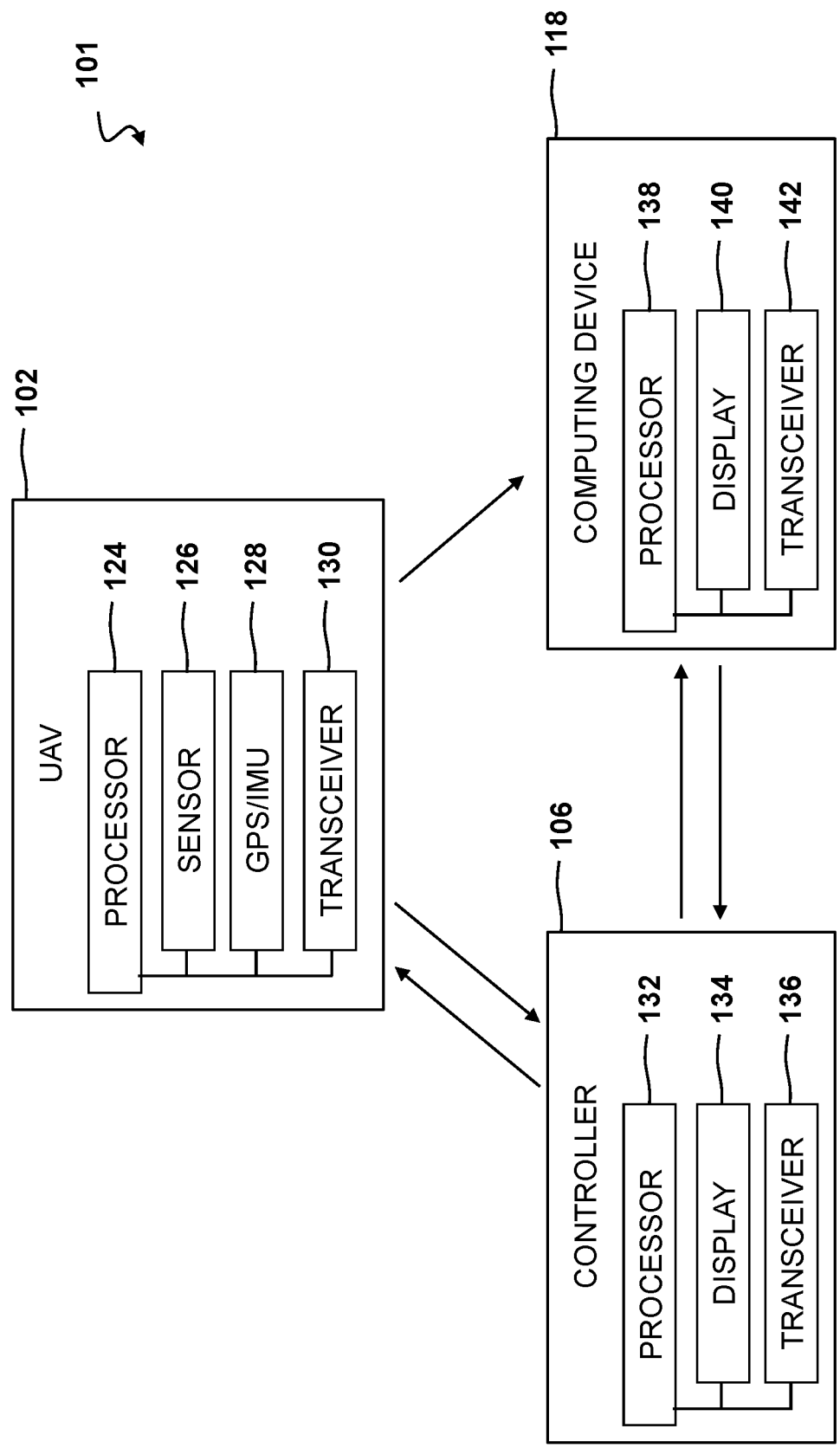
FIG. 1B depicts an exemplary top-level functional block diagram of the UAV, controller, and computing device of FIG. 1A.

FIG. 1B depicts an exemplary top-level functional block diagram 101 of the UAV 102, controller 106, and computing device 118 of FIG. 1A. The UAV 102 may include a processor 124, a sensor 126 in communication with the processor 124, a GPS and/or IMU 128 in communication with the processor 124, and a transceiver 130 in communication with the processor 124. The processor may have addressable memory. The sensor may be a visual imaging sensor, e.g., a camera. In some embodiments, there may be more than one sensor, e.g., a camera and an infrared (IR) sensor. While the methods disclosed herein are primarily for visual sensors, the same principles may be applied to any other sensor having a field of view. The GPS/IMU 128 may be used to provide geographic information relating to the field of view and the center point of any images captured by the sensor 126. The processor 124 may use information relating to the UAV 102 elevation and orientation, sensor 126 parameters, and GPS/IMU 128 to determine a center point of a captured image and a geographic location of each corner of the captured image. The UAV 102 may also include a transceiver 130 to receive and send images, data, flight information, etc. In some embodiments, the UAV 102 may have a separate receiver and/or transmitter. The processor 124 may create the combined image once all of the images of the defined geographic area have been captured and stored. The processor 124 may create the combined image at a set point, e.g., when the UAV transitions to horizontal flight for landing, to ensure that all images for the combined image have been captured.

The controller 106 may include a processor 132, a display 134 in communication with the processor 132, and a transceiver 136 in communication with the processor 132. The processor 132 may have addressable memory. The display 134 may display the combined image to the user. The transceiver 136 may receive the combined image from the UAV 102. In some embodiments, the controller 106 may include a separate receiver and/or transmitter. The controller 106 may be a tablet, smartphone, computing device, etc.

The computing device 118 may include a processor 138, a display 140 in communication with the processor 138, and a transceiver 142 in communication with the processor 138. The processor 138 may have addressable memory. The display 140 may display the combined image and/or further analysis by the processor 138. The transceiver 142 may receive the combined image from the UAV 102 and/or the controller 106. In some embodiments, the computing device 118 may include a separate receiver and/or transmitter. The computing device may be a desktop computer, laptop, tablet, cloud computing, etc.

Figure 2A:
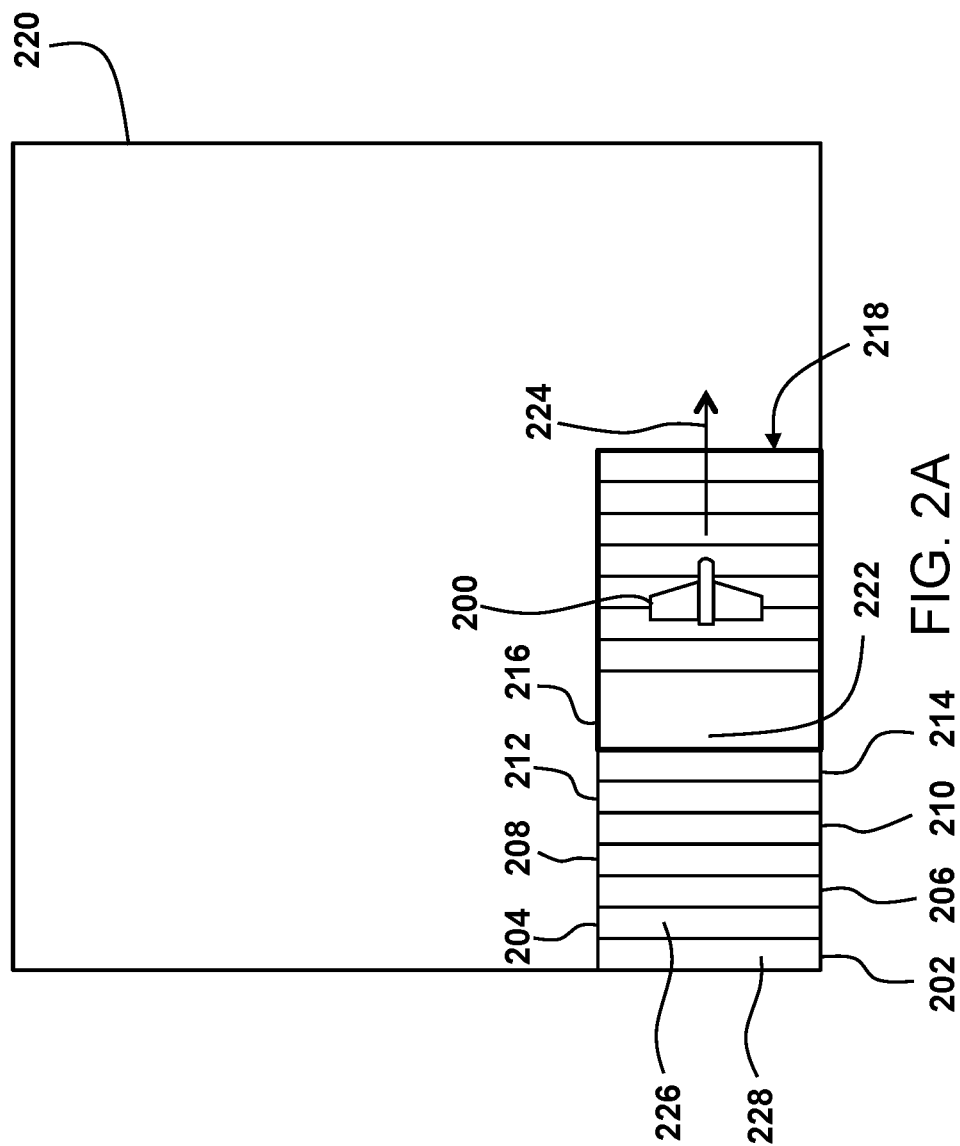
FIG. 2A depicts a UAV capturing a plurality of images of a portion of a geographic area.

FIG. 2A depicts a UAV 200 capturing a plurality of images (202, 204, 206, 208, 210, 212, 214, 216) of a portion 218 of a geographic area 220. As the UAV 200 flies over the geographic area 220, the UAV captures the plurality of images (202, 204, 206, 208, 210, 212, 214, 216), where each image contains at least a portion within the geographic area 220 and where at least two of the images overlap. Point 222 is depicted as captured on eight separate images (202, 204, 206, 208, 210, 212, 214, 216). As the UAV 200 flies forward 224 over the geographic area 220, it will continue to capture additional images, which may be used to create a combined image that may be viewed by a user. To create this combined image, decisions have to be made as to which images to use for which parts of the combined image. As illustrated in FIG. 2A, point 222 is present in eight separate images (202, 204, 206, 208, 210, 212, 214, 216), whereas point 226 is present in two images (202, 204), and point 228 is only present in one image 202.

FIG. 2B depicts a method of combining the plurality of images in FIG. 2A into a combined image of the geographic area 220. In one method, each new image overwrites the data from each previous image. The last image 216 taken by the UAV 200 covers a part of each of the previous seven images (202, 204, 206, 208, 210, 212, 214 in FIG. 2A) taken. This method is simple but results in a combined image comprised mostly of the edges of images. Point 230 is present in seven images (202, 204, 206, 208, 210, 212, 214 in FIG. 2A), but the pixel used in the combined image will be from the edge of image 214, i.e., it is more likely to contain distortion.

Figure 3:
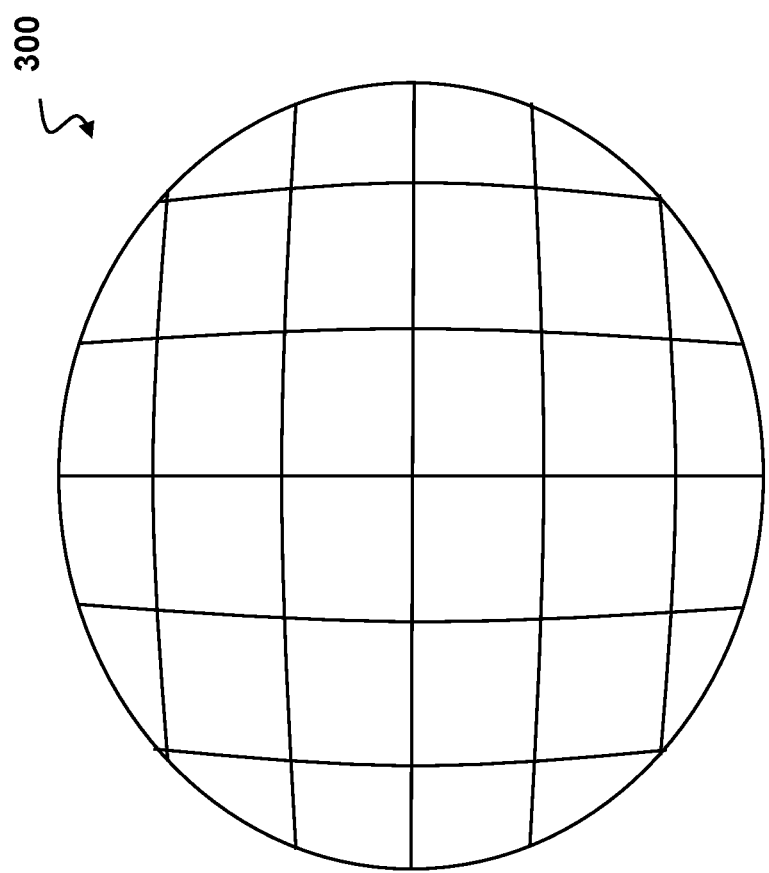
FIG. 3 depicts a lens of a sensor of UAV having barrel distortion.

FIG. 3 depicts a lens 300 of a sensor of UAV having barrel distortion. The lines shown indicate distortion towards the edge of the lens 300. This creates the effect of an image mapped around a sphere and is especially apparent in wide angle and fisheye lenses, which may be used in aerial imaging.

Figure 4:
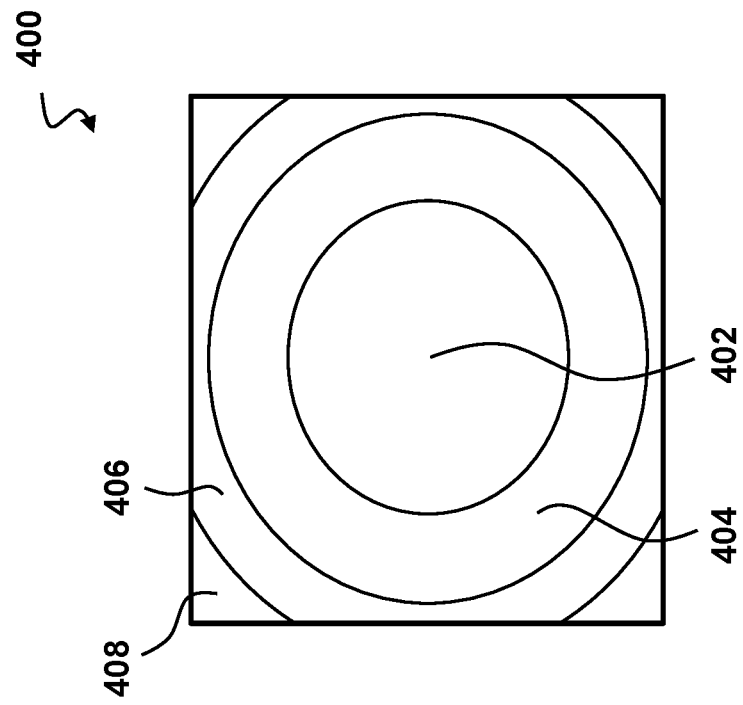
FIG. 4 depicts an image taken from the lens of FIG. 3 showing regions of distortion.

FIG. 4 depicts an image 400 taken from the lens of FIG. 3 showing regions of distortion. A first or center region 402 of the image has minimal distortion. A second region 404 is illustrated as having some distortion—relative to and more than the first region 402. A third region 406 has greater distortion—relative to and more than the second region 406. A fourth or outer region 408 has the most distortion—relative to the other regions. A combined image created via the method shown in FIGS. 2A-2B will use pixels from images primarily in the third region 406 and fourth region 408 where distortion is greatest. As a result, the combined image will be far more distorted, and less accurate, than an image using pixels primarily in the first region 402 and the second region 404 having minimal distortion, as shown in the system and method disclosed in FIGS. 5A-5F.

Figure 5A:
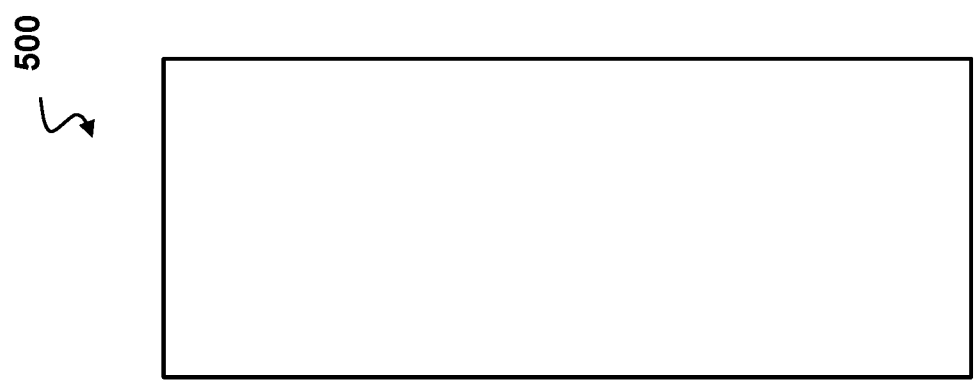
FIG. 5A depicts a plurality of geographic areas.
Figure 5A:
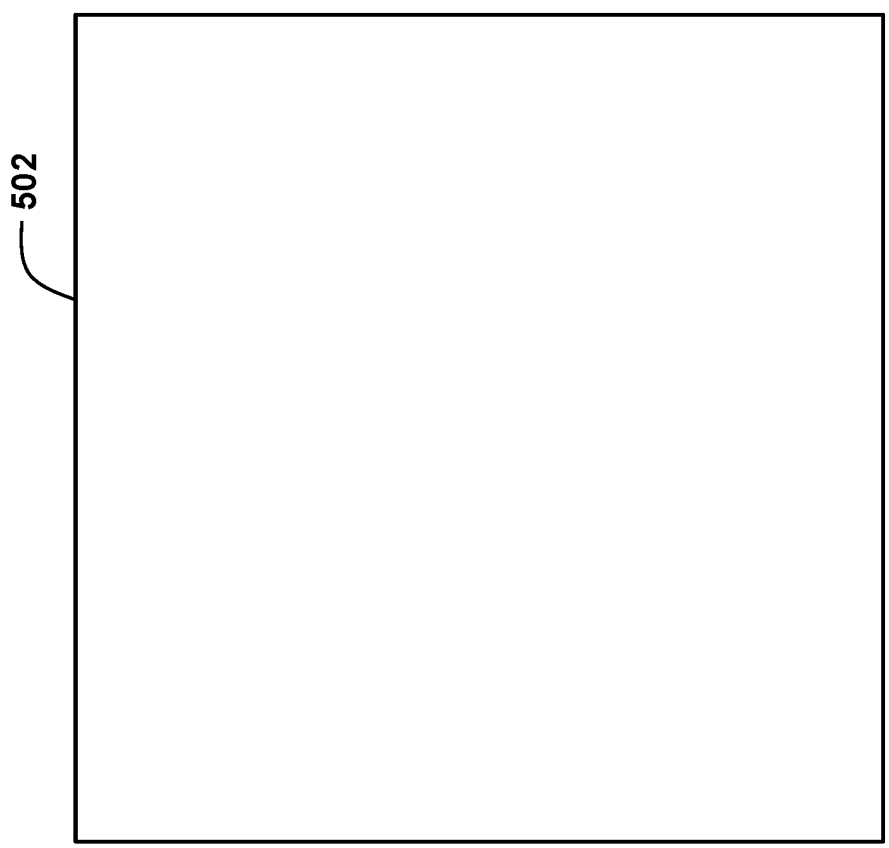
Figure 5A:
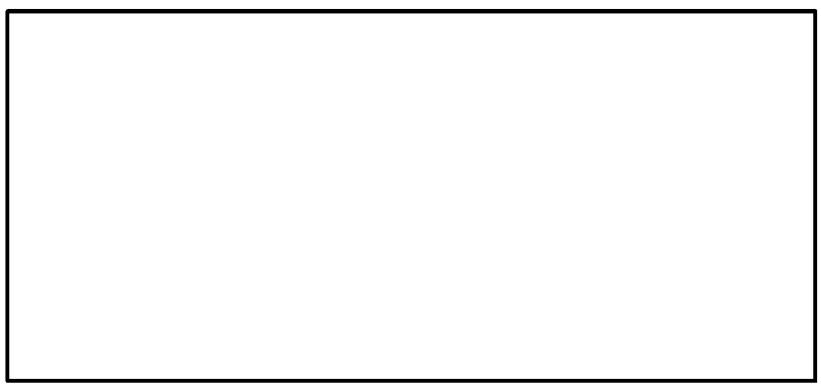

FIG. 5A depicts a plurality of geographic areas 500. A user may define a geographic area 502 of a plurality of geographic areas 500. In one example of the present embodiments, the defined geographic area 502 may be a field containing crops.

Figure 5B:
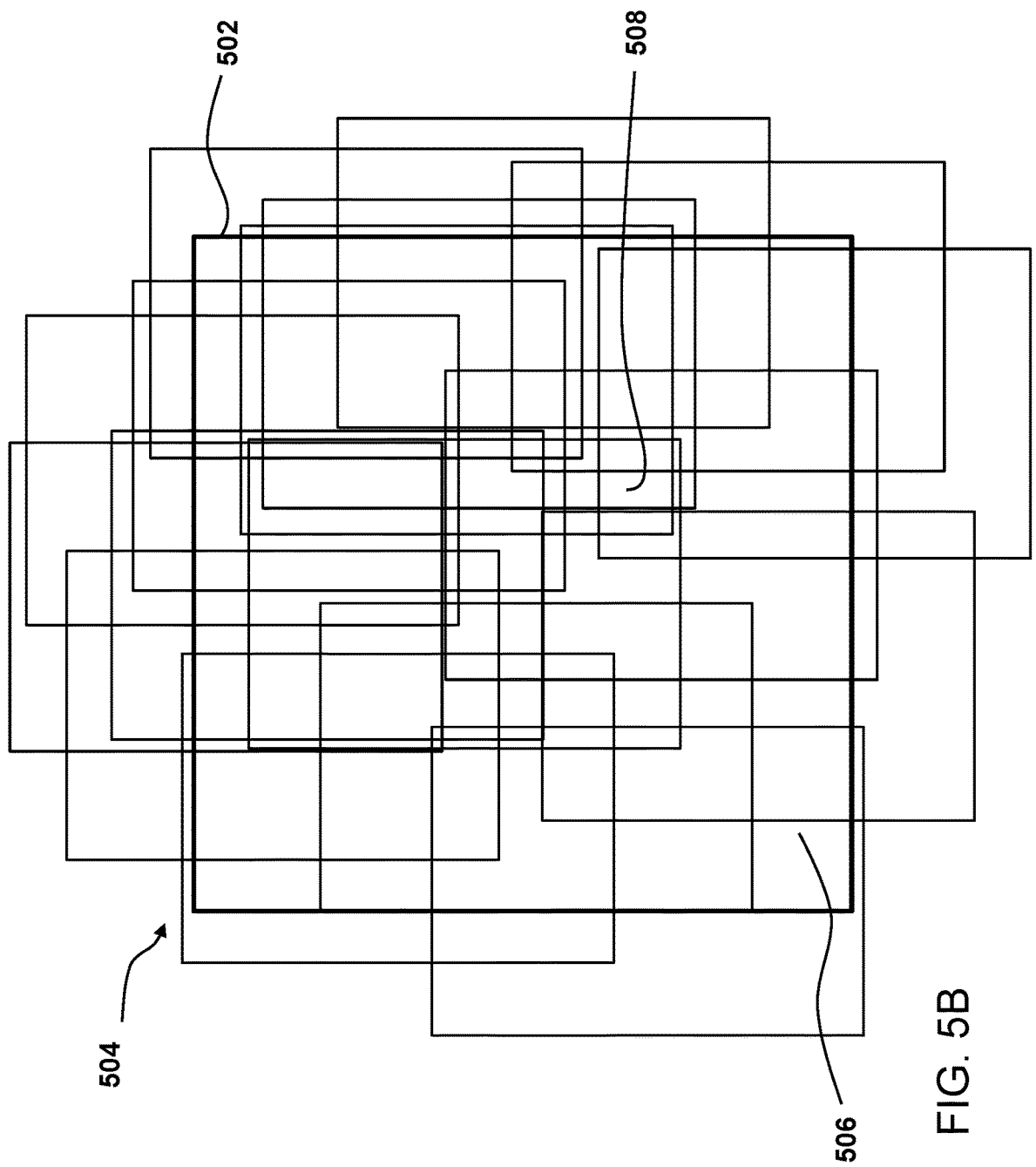
FIG. 5B depicts a plurality of images taken by an aerial vehicle of a selected geographic area in FIG. 5A.

FIG. 5B depicts a plurality of images 504 taken by an aerial vehicle of a selected geographic area in FIG. 5A, shown as rectangles overlaid on the geographic area 502. Point 506 is captured by a single image, whereas point 508 is captured in five separate images. A choice needs to be made as to which pixel to use for point 508 in the combined image from a choice of five images.

Figure 5C:
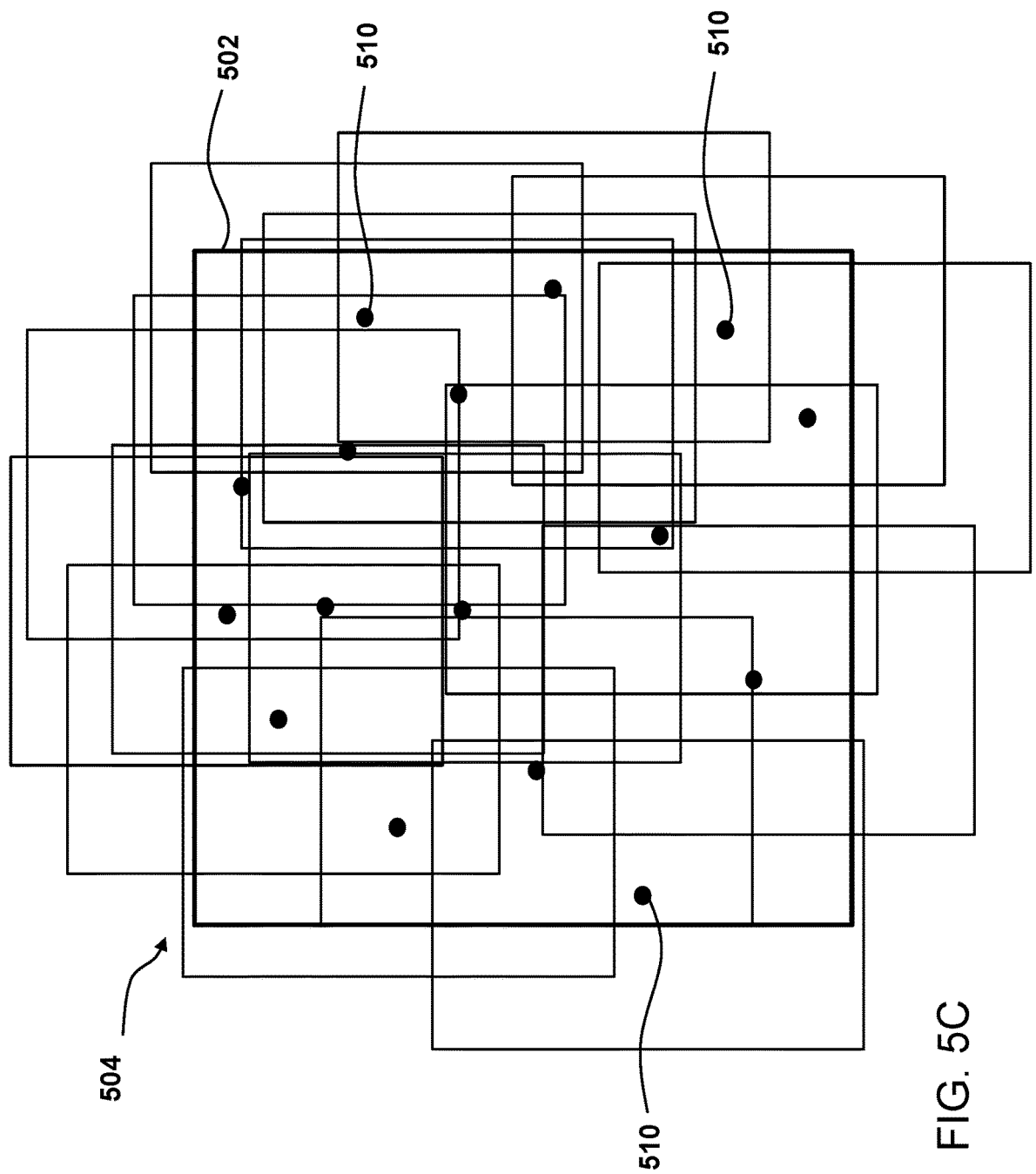
FIG. 5C depicts a plurality of image points for each of the plurality of images in FIG. 5B.

FIG. 5C depicts a plurality of image points 510 for each of the plurality of images 504 in FIG. 5B. The image points 510 are the geographic locations of a center of each image of the received plurality of images 504.

FIG. 5D depicts the plurality of image points 510 in FIG. 5C. The image points 510 are shown within the geographic area 502 with the image boundaries removed from FIG. 5C.

Figure 5E:
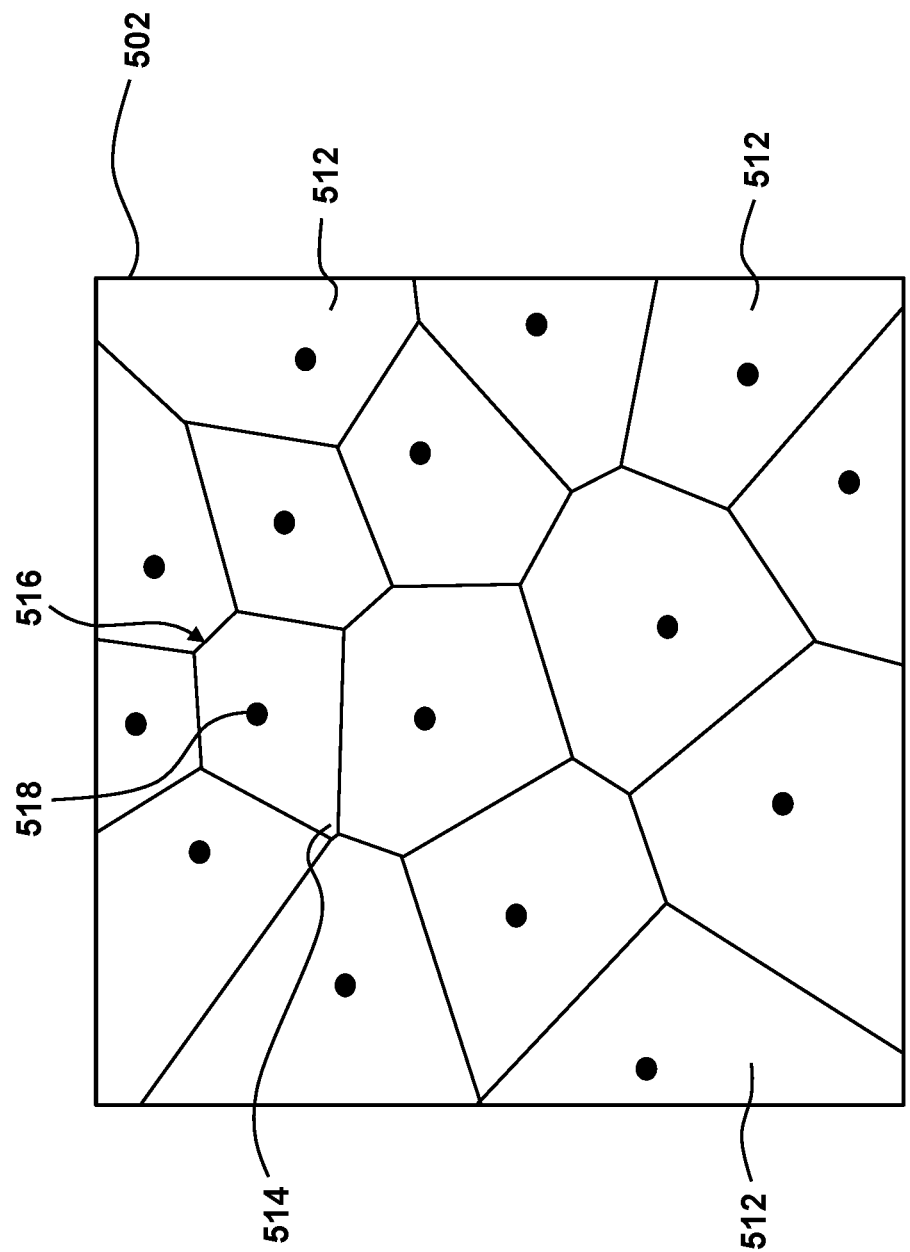
FIG. 5E depicts a partition of the geographic area into a plurality of image regions based on the image points in FIG. 5D.

FIG. 5E depicts a partition of the geographic area 502 into a plurality of image regions 512, or cells, based on the image points in FIG. 5D. Each pixel in each image region, or cell, is closer in distance to an image point that is closest to the pixel than any other image point. Pixel 514 is illustrated in this example as being within image region 516, because it is closer to image point 518 than any other image point.

Figure 5F:
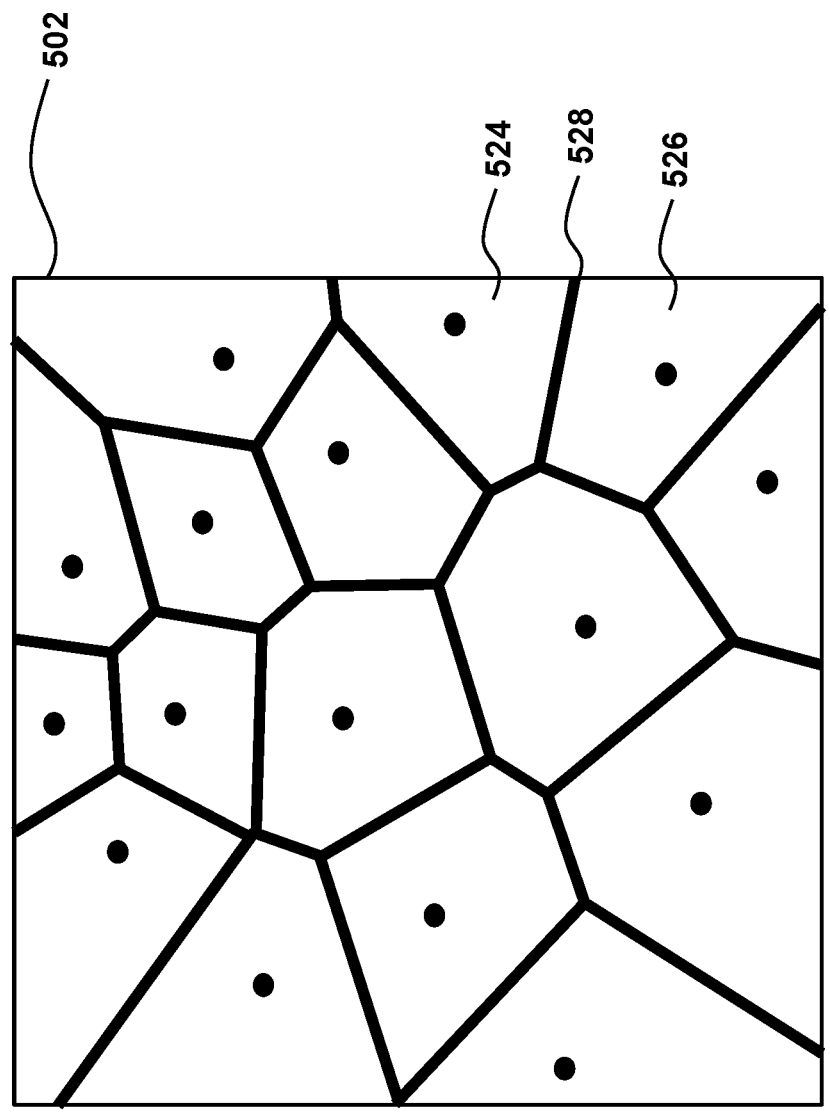
FIG. 5F depicts a partition of the geographic area into a plurality of image regions with an added overlap based on the image points in FIG. 5D.

FIG. 5F depicts a partition of the geographic area 502 into a plurality of image regions 524, 526 with an added overlap 528 based on the image points in FIG. 5D. A first image region 524 may be adjacent to a second image region 526. Dividing the geographic area 502 into the first image region 524 and the second image region 526 may create a gap between the first image region 524 and the second image region 526 as the combined image (520, FIG. 5G) may include white or blank pixels on the border between the two regions 524, 526. To avoid having white or blank pixels, each image region 524, 526 may be expanded by a set amount, such as a set number of pixels or a set percentage. As each image region 524, 526 may be larger than the area used for the combined image (520, FIG. 5G), each image region 524, 526 may be expanded along each border to create the overlap 528. The overlap 528 includes images from two or more image regions 524, 526 and provides a more complete combined image (520, FIG. 5G) without any white or blank pixels due to combining the image regions 524, 526 along their respective borders.

FIG. 5G depicts a combined image 520 created based on the plurality of image regions in FIGS. 5E-5F. The example of the image in this figure shows a combined image 520 that may be of a field in agricultural use. A user may be able to quickly view the combined image 520 and identify any trouble spots 522, such as crop stress, water issues, etc. via the combined image being transmitted to the controller 106 (FIG. 1A).

Figure 6:
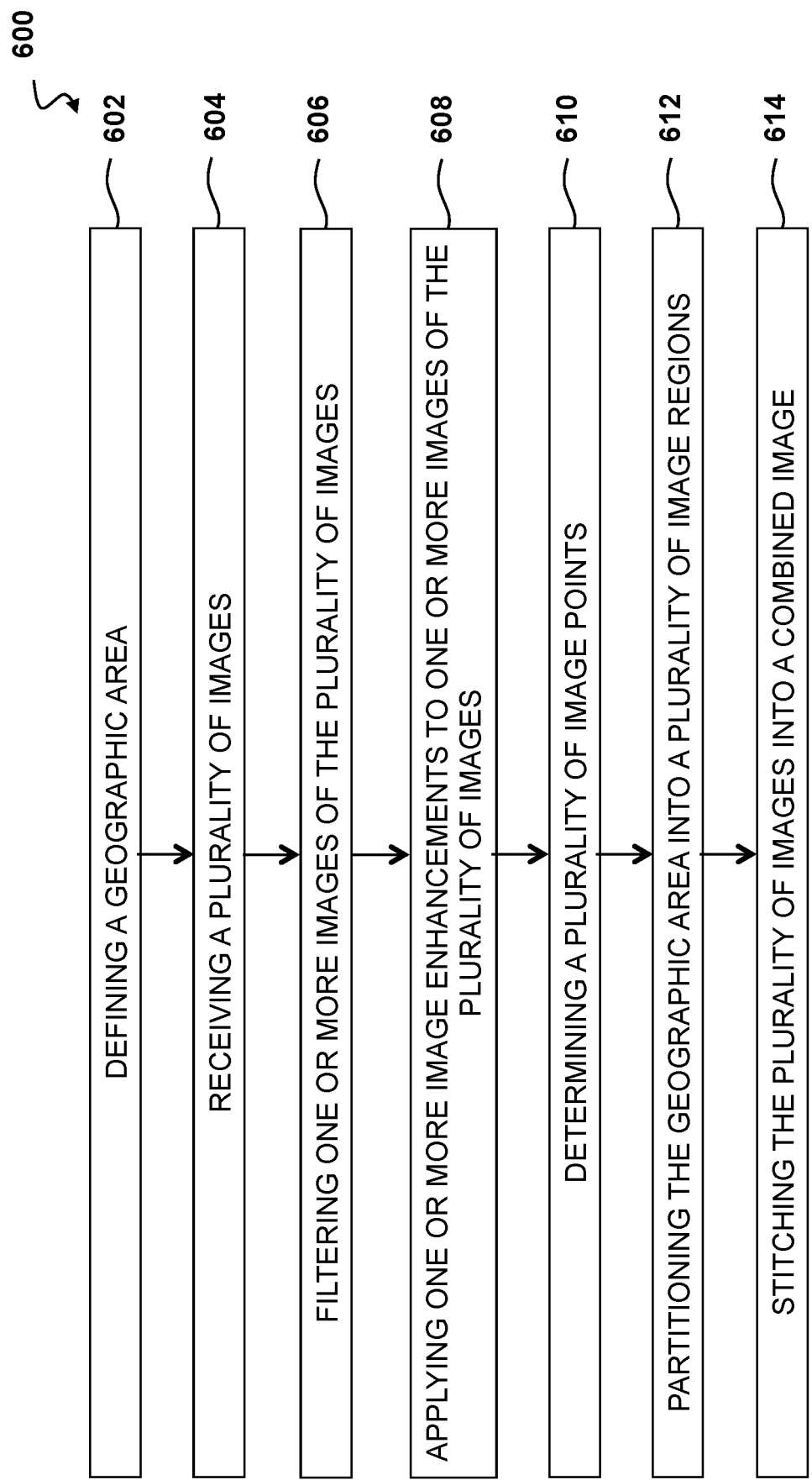
FIG. 6 depicts a flowchart of a method for generating a combined image from a plurality of images of a geographic area.

FIG. 6 depicts a flowchart of a method 600 for generating a combined image from a plurality of images of a geographic area. In one aspect of the present embodiments, a geographic area may be defined (step 602). For example, a user may define the geographic area as an area to be imaged by an aerial vehicle. A plurality of images of the geographic area may be received (step 604). At least a portion of each received image may be within the geographic area. One or more images of the plurality of images may be filtered (step 606). In some embodiments, one or more images may have a defect, such as an undesirable exposure, shutter, blur, or the like. These images may be filtered out so as not to be used when the combined image is being created. The system may remove any images that fall outside of set criteria, such as exposure, distortion, blur, or the like. The system may also compare images to adjacent images, such as images taken before or after, to identify any potential issues that may result in an undesired or inaccurate combined image if the image is used as part of the combined image. The system may remove any images that fall below a set standard as long as a desired overlap for the images is retained. For example, a technical error may cause a shortened shutter and reduced exposure for a first image, a slightly reduced exposure for a second image, and proper exposure for a third image. The system may filter out the first image and/or the second image. If removing both images would lower the desired overlap below a set amount, then the system may only discard the first image and may perform further processing on the second image. In some embodiments, the system may retain all images for use in creating the combined image.

The method may also include applying one or more image enhancements to one or more images of the plurality of images (step 608). The system may brighten, darken, color correct, white balance, sharpen, correct lens distortion, adjust contrast, or otherwise enhance each image to be combined into the combined image. For example, the system may apply an image enhancement to each image such that the exposure is constant. An underexposed image may have its exposure raised while an overexposed image may have its exposure lowered. When the images are combined, the exposure will be constant across the combined image and the combined image will make it easier for a user to view and identify any areas for concern. In some embodiments, the system may create a copy of each image with the image enhancements applied. The original images may be untouched and can be further processed by the system, a cloud computing system, or another system for further analysis.

A plurality of image points may be determined (step 610). Each image point may be a geographic location of a center of each image of the received plurality of images. Each image point may be a center location of the image, which may be a center field of view (CFOV) of the camera or imager. The CFOV may be a line projected directly out of center of the camera or imager and to the ground. In some embodiments, the camera or imager may be mounted to a UAV and if the UAV is rotated then the CFOV will project to the ground at a different location. The system may record the geographic location, such as latitude and longitude for the CFOV of the camera or imager. In some embodiments, the system may also determine the geographic location of each of the four corners of each image for determining a location of the image when combining into a combined image.

The geographic area may be partitioned into a plurality of image regions (step 612). Each pixel in each image region may be closer to a closest image point than any other image points. This partition ensures that the pixels used in a combined image are closer to a center of an image where there is less distortion, as shown in FIG. 4. The partition may use a Voronoi diagram to determine which pixels to use in the combined image. The plurality of images may be stitched into the combined image (step 614). Each pixel in the combined image may be selected from its corresponding image region. In some embodiments, each image in the combined image may have its edges expanded by a set amount, such as a set number of pixels, to create a smoother image and avoid any white or blank pixels on the borders between respective image regions.

Figure 7:
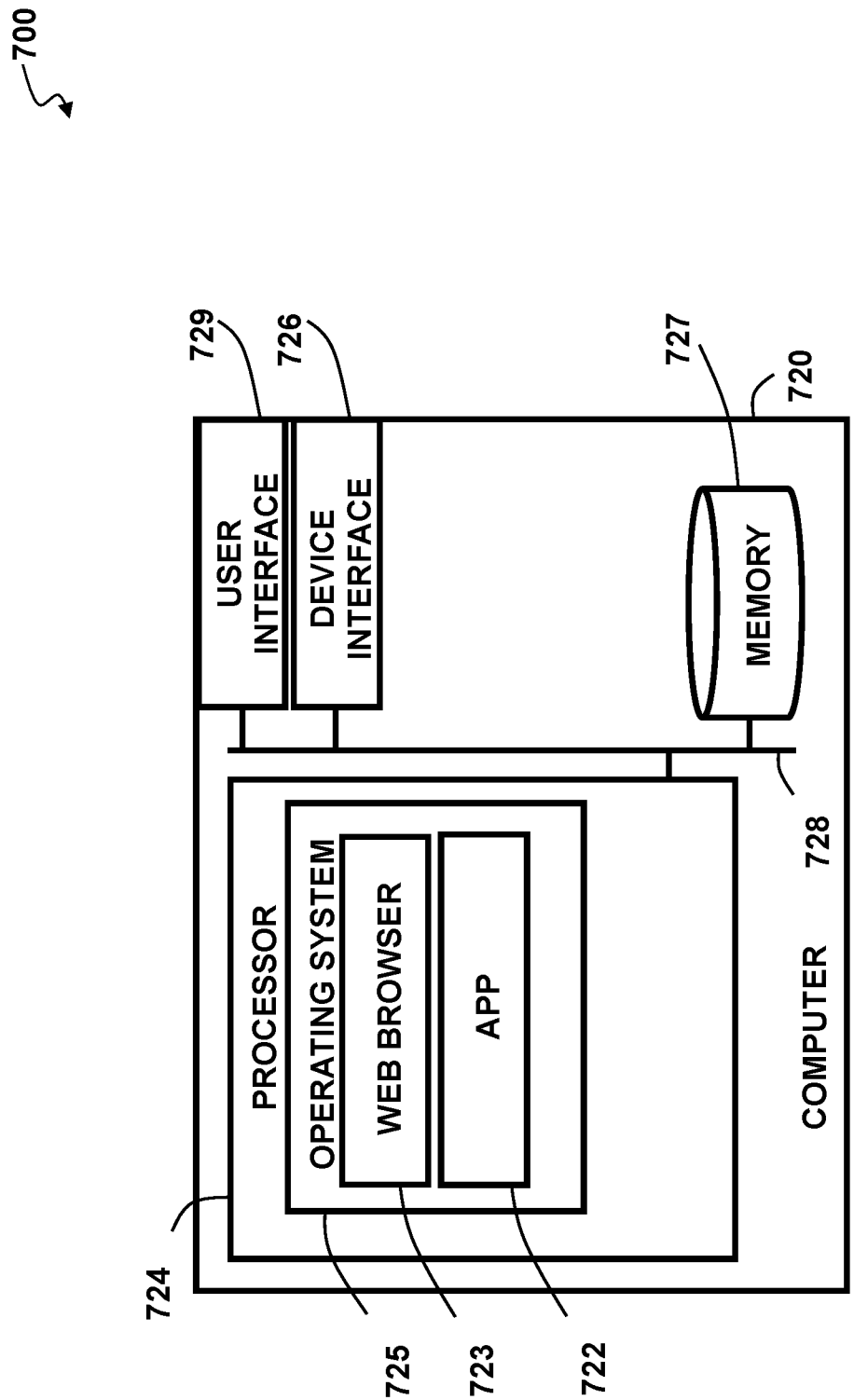
FIG. 7 illustrates an exemplary top-level functional block diagram of a computing device embodiment of an imaging system.

FIG. 7 illustrates an exemplary top-level functional block diagram of a computing device embodiment of an imaging system, such as UAV 102, controller 106, or computing device 118 of FIG. 1B. The exemplary embodiment 700 is shown as a computing device 720 having a processor 724, such as a central processing unit (CPU), addressable memory 727, an external device interface 726, e.g., an optional universal serial bus port and related processing, and/or an Ethernet port and related processing, and an optional user interface 729, e.g., an array of status lights and one or more toggle switches, and/or a display, and/or a keyboard and/or a pointer-mouse system and/or a touch screen. Optionally, the addressable memory 727 may for example be: flash memory, eprom, and/or a disk drive or other hard drive. These elements may be in communication with one another via a data bus 728. The processor 724 may have an operating system 725 such as one supporting a web browser 723 and/or applications 722, which may be configured to execute steps of a process according to the exemplary embodiments described herein.

Figure 8A:
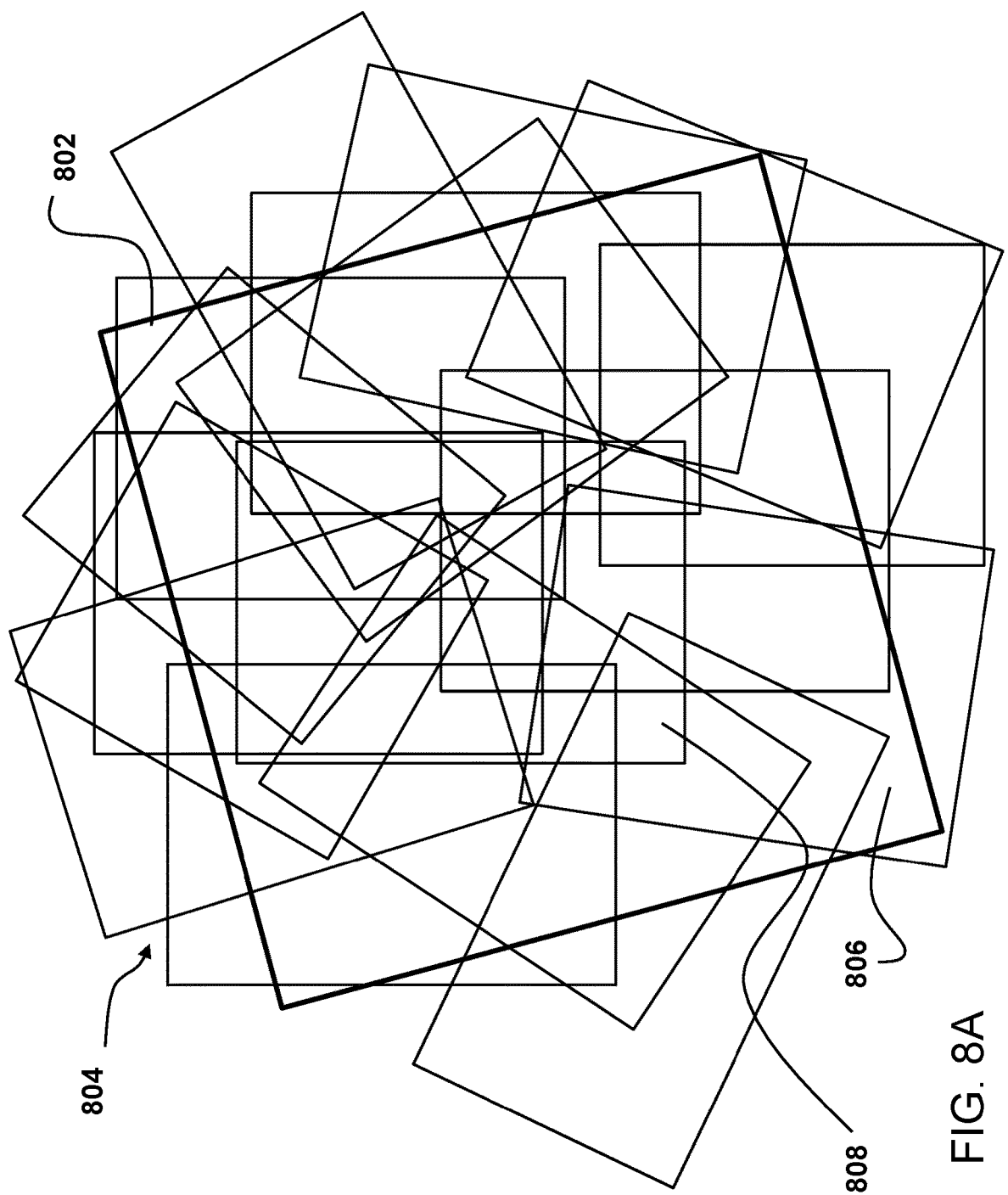
FIG. 8A depicts a plurality of images taken by an aerial vehicle of a selected geographic area, shown as rectangles overlaid at varying angles to one another.

Like with FIG. 5A, FIG. 8A depicts a plurality of images 804 taken by an aerial vehicle of a selected geographic area, shown as rectangles overlaid but unlike FIG. 5 the rectangles are at varying angles to one another. Point 806 is captured by a single image, whereas point 808 is captured in four separate images. A choice needs to be made as to which pixel to use for point 808 in the combined image from a choice of four images.

Figure 8B:
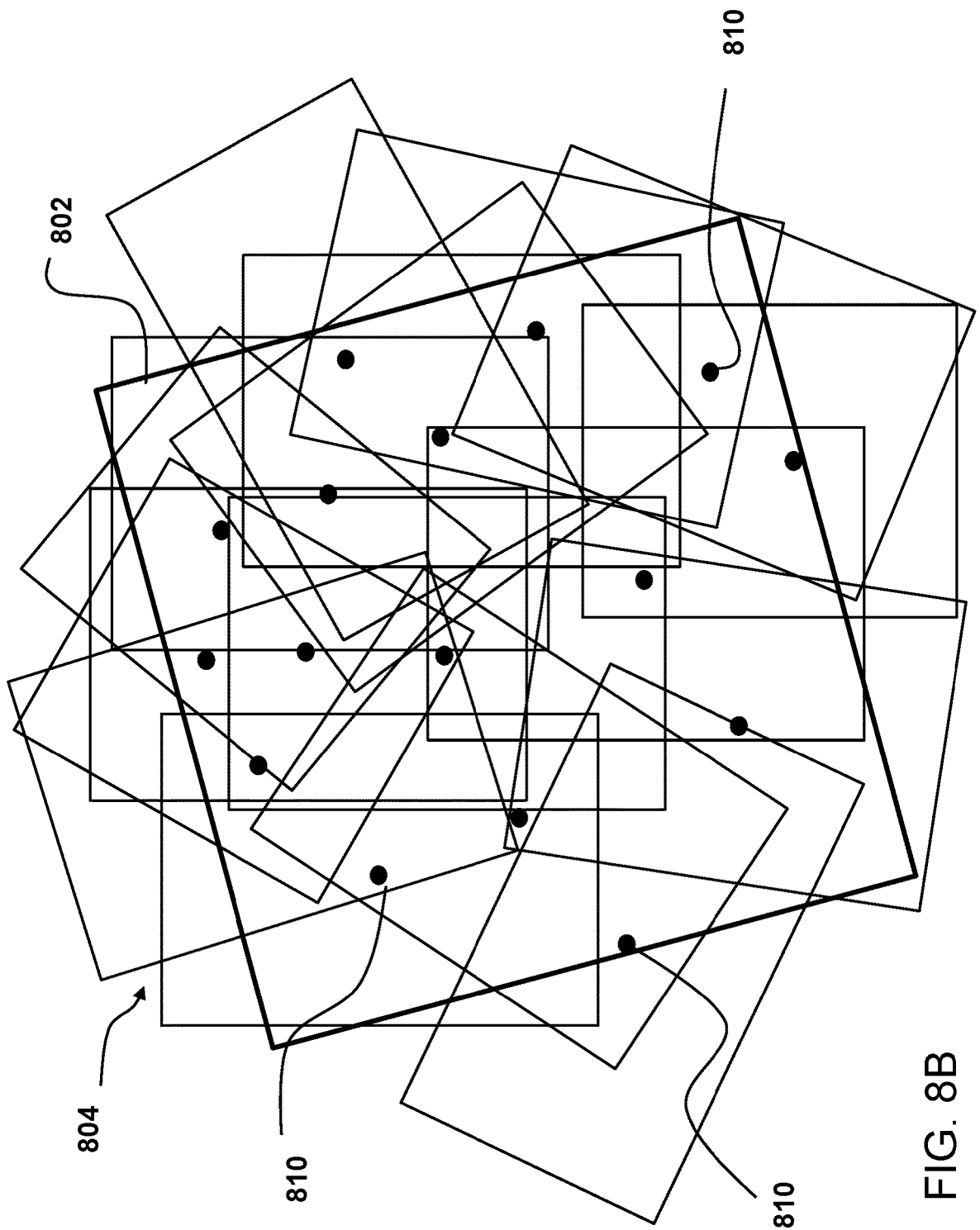
FIG. 8B depicts a plurality of image points for each of the plurality of images in FIG. 8A.

FIG. 8B depicts a plurality of image points 810 for each of the plurality of images 804 in FIG. 8A. The image points 810 are the geographic locations of a center of each image of the received plurality of images 804.

Figure 8C:
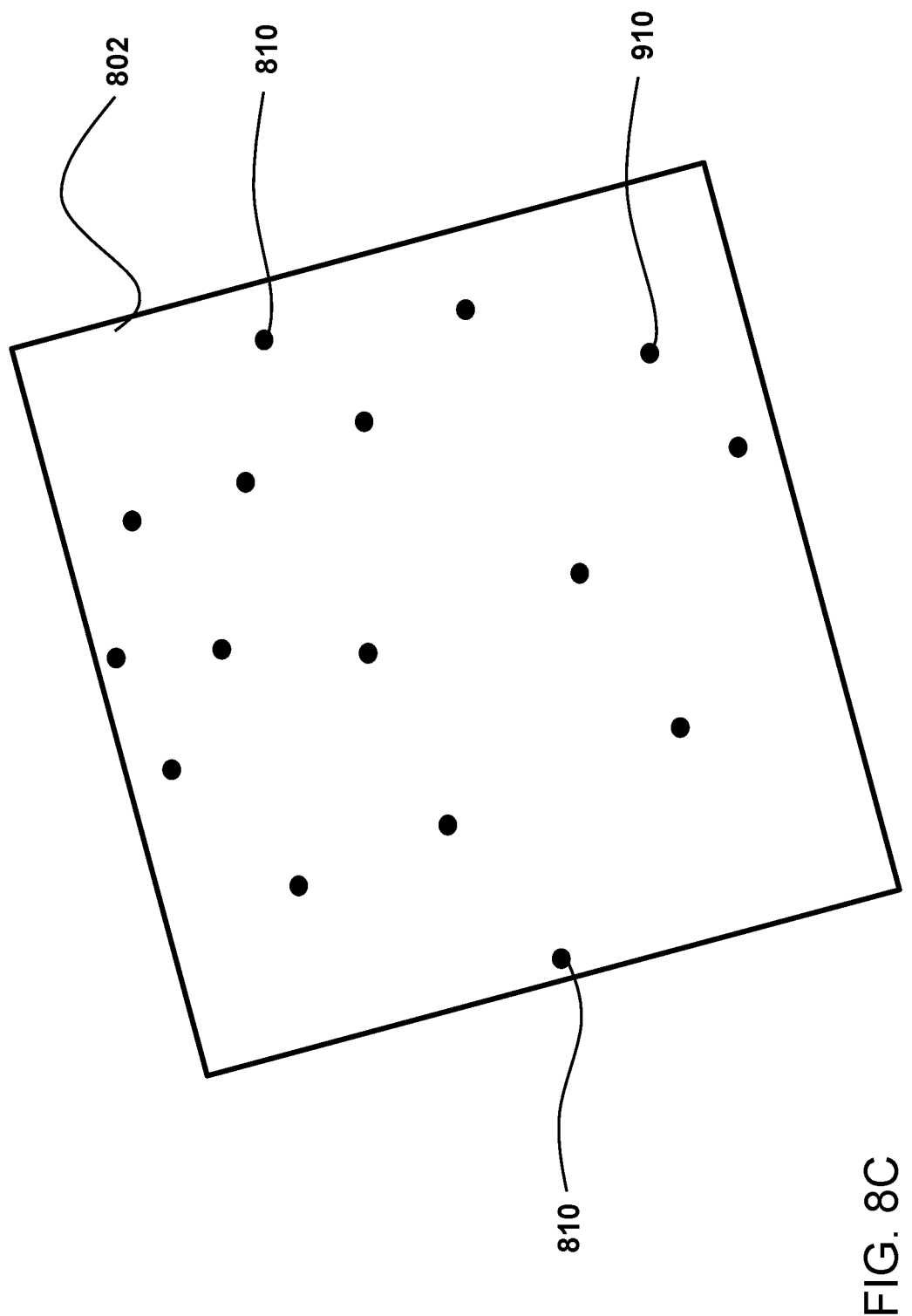
FIG. 8C depicts the plurality of image points in FIG. 8B.

FIG. 8C depicts the plurality of image points 810 in FIG. 8B. The image points 810 are shown within the geographic area 802 with the image boundaries removed from FIG. 8B.

Figure 8D:
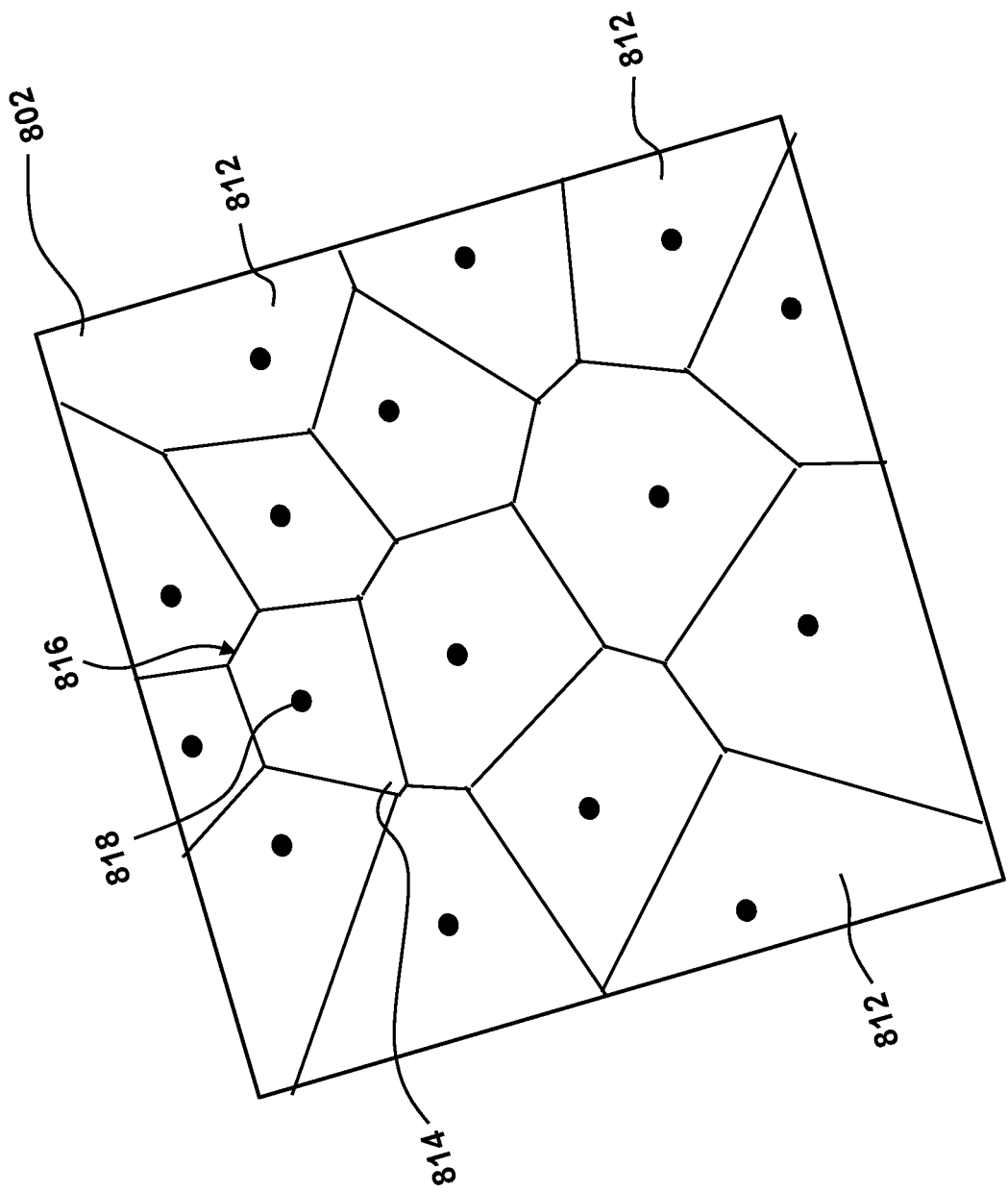
FIG. 8D depicts a partition of the geographic area into a plurality of image regions based on the image points in FIG. 8C.

FIG. 8D depicts a partition of the geographic area 802 into a plurality of image regions 812 based on the image points in FIG. 8C. Each pixel in each image region is closer in distance to an image point that is closest to the pixel than any other image point. Pixel 814 is illustrated in this example as being within image region 816, because it is closer to image point 818 than any other image point.

In some aspect of the present embodiments, location information, such as GPS coordinates, may be embedded in the image or stored in a separate data file and associated with the image, to provide information about where the images were taken from so that coordinates related to the images may be used. Accordingly, during the processing, images may further be stitched together based on the GPS coordinates associated with the image.

Figure 9A:
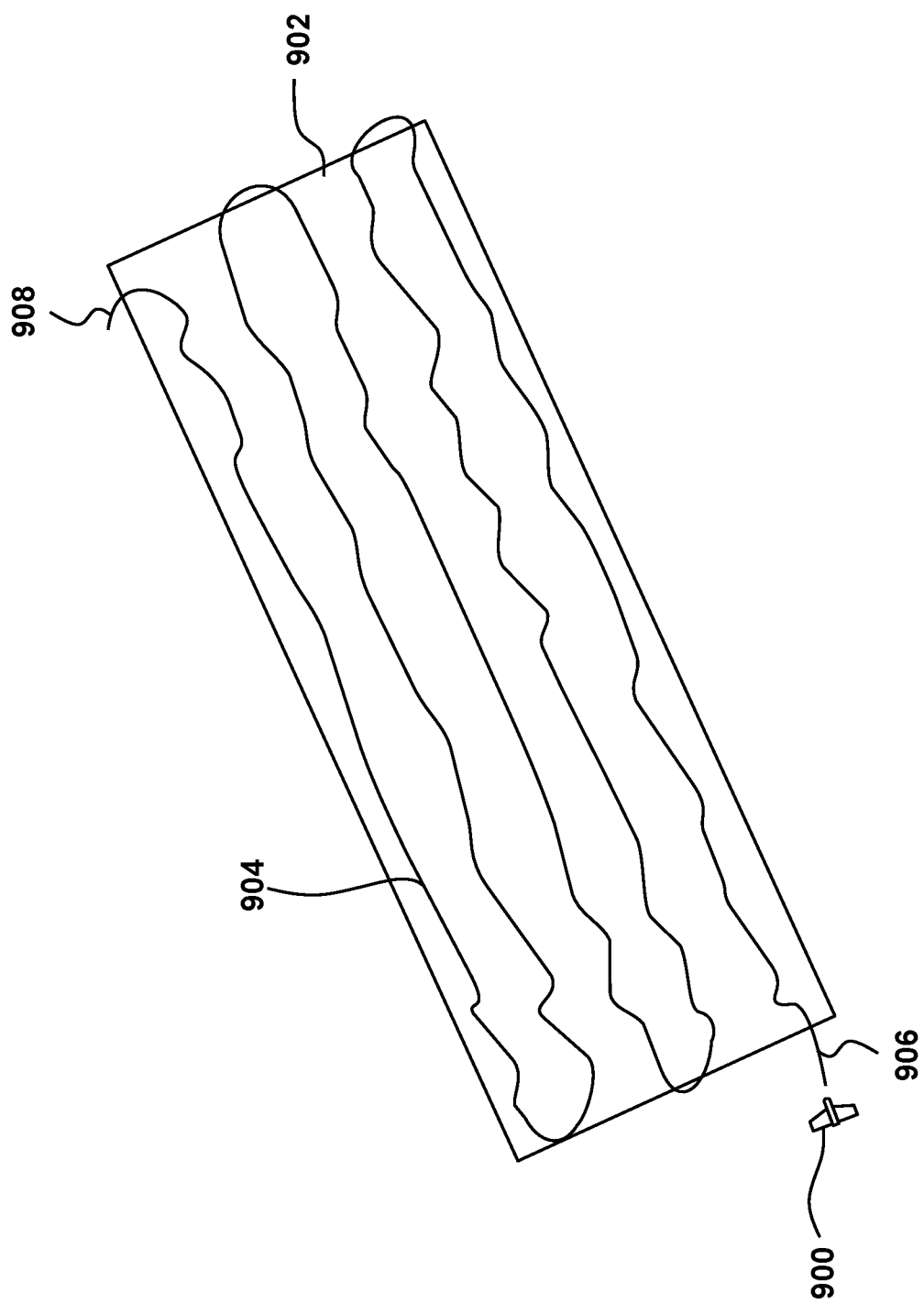
FIG. 9A depicts a flight path of an aerial vehicle capturing a plurality of images of a portion of a geographic area.

FIG. 9A depicts a flight path 904 of an aerial vehicle 900 capturing a plurality of images of a portion of a geographic area 902. The aerial vehicle may fly in any path to obtain a desired number of images with a desired amount of overlap for the geographic area 902. In some embodiments, the aerial vehicle 900 may fly segments of substantially straight flight paths with turns connecting each segment. The flight path 904 of the aerial vehicle 900 may diverge from substantially straight flight paths due to wind, obstacles, or the like. The flight path 904 shown in FIG. 9A may allow for a desired coverage and overlap of the geographic area 902 while diverting from ideal substantially straight flight segments. The flight path may start 906 prior to entering the geographic area 902 and end 908 after exiting the geographic area. Additional flight path segments may link the start 906 and end 908 segments of the flight path 904 for take-off and/or landing. The aerial vehicle 900 may be a UAV in some embodiments, such as a VTOL UAV.

Figure 9B:
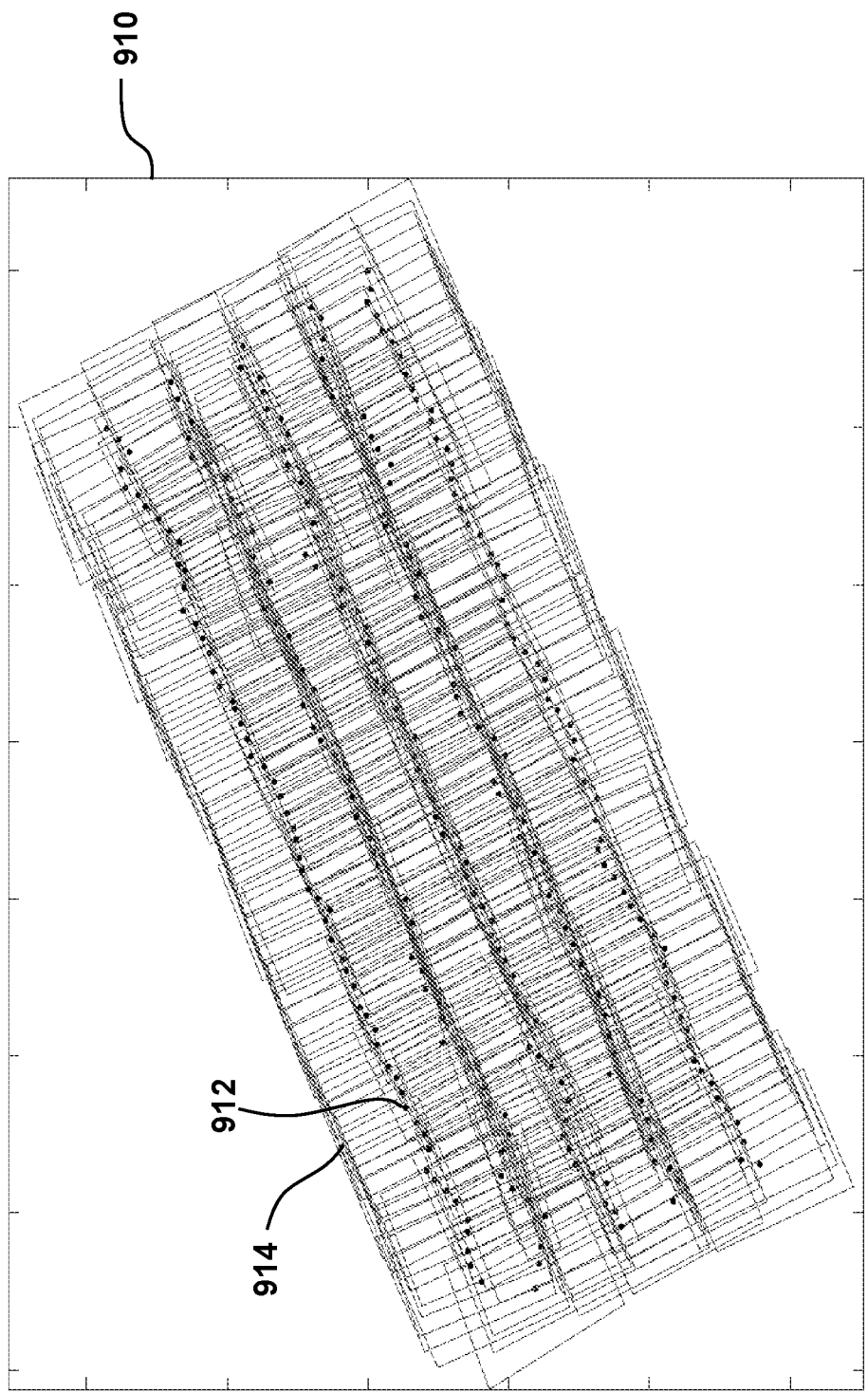
FIG. 9B depicts a plurality of image points for each of a plurality of images taken by the aerial vehicle of the selected geographic area in FIG. 9A.

FIG. 9B depicts a plurality of image points 912 for each of a plurality of images taken by the aerial vehicle of the selected geographic area in FIG. 9A. Each image point 912 depicts a center field of view (CFOV) of an image, with each image border 914 shown in a rectangular overlay. The image combination 910 includes each image taken by the aerial vehicle in the flight path shown in FIG. 9A. Each image has considerable overlap to allow for minimizing each image region or cell in the combined image, discarding any images containing errors, or the like. Each image may have image enhancements applied to create a smoother, more accurate, easier to view, or the like combined image.

Figure 9C:
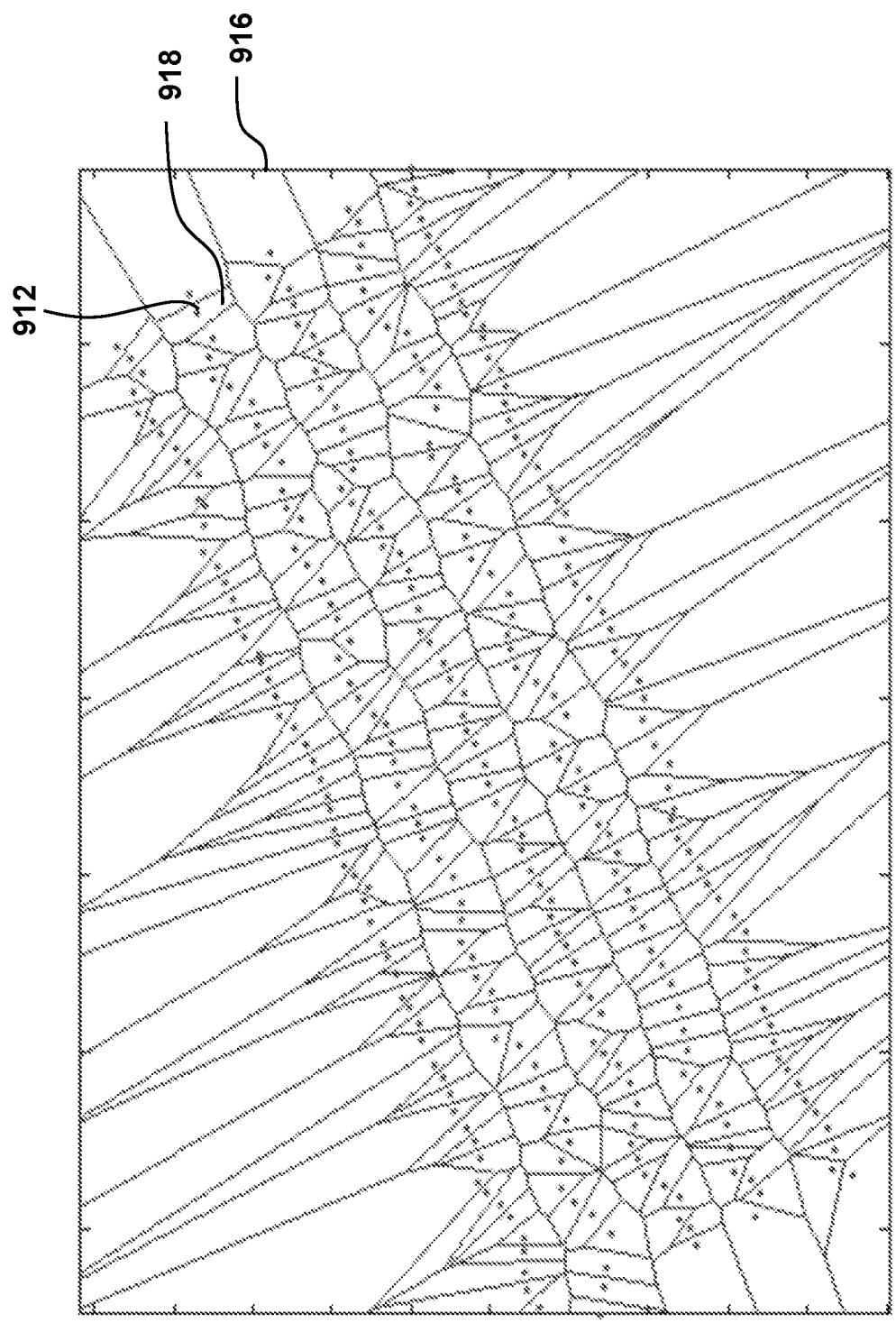
FIG. 9C depicts a partition of the geographic area into a plurality of image regions based on the image points in FIG. 9B.

FIG. 9C depicts a partition of the geographic area into a plurality of image regions based on the image points in FIG. 9B. The combined image 916 includes a plurality of image regions, or cells. Each pixel in each image region is closer to the image point 912 of its respective image region than any other image point. The combined image 916 may provide an accurate and detailed view of the geographic area (902, FIG. 9A). Any regions outside of the geographic area (902, FIG. 9A) may be cropped out, removed, be shown in less detail or accuracy, or the like. In some embodiments, the aerial vehicle processor, system processor, or other processor may have constructed the combined image 916 for viewing by a user by the time the aerial vehicle has landed.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A method comprising:
   defining a geographic area, wherein the geographic area comprises an area to be imaged;
   receiving a plurality of images of the geographic area, wherein a portion of each received image is within a defined geographic area, wherein each received image includes geographical coordinates of the portion-of the defined geographic area, and wherein the geographical coordinates of at least two of the received plurality of images overlap within the defined geographic area;

determining a set of images from the received plurality of images for further processing by selecting at least one image of the plurality of images capturing an overlapping defined geographic area is to be used, the selecting based on whether the image falls within a set criteria of shutter, exposure or blur and a desired overlap remains below a set amount;

determining a plurality of image points, wherein each image point is a geographic location of a center field of view of each image of the determined set of images;

partitioning the geographic area into a plurality of image regions based on the determined plurality of image points; and generating a combined image by stitching the partitioned geographic area of the determined set of images into the combined image based on the plurality of image regions and the geographical coordinates of each image of the set of images.

2. The method of claim 1 wherein partitioning the geographic area into the plurality of image regions further comprises:
generating a Voronoi diagram.

3. The method of claim 1 further comprising:
capturing the plurality of images by an aerial vehicle.

4. The method of claim 3 wherein the aerial vehicle is a vertical takeoff and landing (VTOL) unmanned aerial vehicle (UAV).

5. The method of claim 1 further comprising:
filtering one or more images of the received plurality of images.

6. The method of claim 5 wherein filtering the one or more images further comprises:
removing the one or more images due to at least one of: overexposure, underexposure, distortion, blur, and an error with a camera taking the image.

7. The method of claim 1 further comprising:
applying one or more image enhancements to one or more images of the received plurality of images.

8. The method of claim 7 wherein applying image enhancements to the one or more images comprises at least one of: brightening, darkening, color correcting, white balancing, sharpening, correcting lens distortion, and adjusting contrast.

9. A comprising:
an unmanned aerial vehicle (UAV) comprising:
a processor having addressable memory;
a sensor in communication with the processor, the sensor configured to capture a plurality of images; and
wherein the processor is configured to:
receive a geographic area, wherein the geographic area comprises an area to be imaged by the sensor of the UAV;
receive the plurality of images from the sensor of the geographic area, wherein each image of the plurality of images includes geographical coordinates of a corresponding region of the geographic area, and wherein the geographical coordinates of at least two of the received plurality of images overlap within the defined geographic area;
determine a set of images from the received plurality of images for further processing by selecting at least one image of the plurality of images capturing an overlapping defined geographic area is to be used, the selecting based on whether the image falls within a set criteria of shutter, exposure or blur and a desired overlap remains below a set amount;

determine a plurality of image points, wherein each image point is a geographic location of a center field of view of each image of the selected plurality of images;

partition the geographic area into a plurality of image regions based on the determined plurality of image points; and generate a combined image by stitching the partitioned geographic area of the determined set of images into the combined image based on the plurality of image regions and the geographical coordinates of each of the set of images.

10. The system of claim 9 wherein the UAV further comprises:
a global positioning system (GPS) in communication with the processor, wherein the processor uses the GPS to determine the geographic location of each image point of the plurality of image points.

11. The system of claim 9 wherein the processor is further configured to generate a Voronoi diagram to partition the geographic area into the plurality of image regions.

12. The system of claim 9 wherein the UAV is a vertical takeoff and landing (VTOL) UAV.

13. The system of claim 9 wherein the processor is further configured to:
filter one or more images of the received plurality of images, wherein filtering the one or more images further comprises: removing the one or more images due to at least one of: overexposure, underexposure, distortion, blur, and an error with a camera taking the image.

14. The system of claim 9 wherein the processor is further configured to:
apply one or more image enhancements to one or more images of the received plurality of images, wherein applying image enhancements to the one or more images comprises at least one of: brightening, darkening, color correcting, white balancing, sharpening, correcting lens distortion, and adjusting contrast.

15. The system of claim 9 further comprising:
a controller comprising:
a processor having addressable memory, wherein the processor is configured to:
define the geographic area;
send the geographic area to the UAV; and
receive the combined image from the UAV.

16. The system of claim 15 further comprising:
a computing device comprising a processor and addressable memory, wherein the processor is configured to:
receive the combined image from at least one of: the UAV and the controller; and
analyze the combined image.

17. The system of claim 16 wherein analyzing the combined image comprises comparing the combined image to a historical combined image.

18. The system of claim 16 wherein the processor of the computing device is further configured to smooth the combined image to account for at least one of: brightness, color, dead pixels, and lens distortion.

19. The system of claim 16 wherein the processor of the computing device is further configured to:
receive the plurality of images; and stitch the plurality of images into a high resolution combined image based on the plurality of image regions, wherein each pixel in the combined image is selected from its corresponding image region.

20. A comprising:

receiving the plurality of images of a geographic area, wherein the geographic area comprises an area to be imaged, wherein each image of the plurality of images includes geographical coordinates of a corresponding region of the geographic area, and wherein the geographical coordinates of at least two of the received images overlap within the defined geographic area;

determining a set of images from the received plurality of images for further processing by selecting at least one image of the plurality of images capturing an overlapping defined geographic area is to be used, the selecting based on whether the image falls within a set criteria of shutter, exposure or blur and a desired overlap remains below a set amount;

determining a plurality of image points, wherein each image point is a geographic location of a center field of view of each image of the determined set of images;

partitioning the geographic area into a plurality of image regions based on the determined plurality of image points;

generating a combined image by stitching partitioned geographic area of the determined set of images into the combined image based on the plurality of image regions and the geographical coordinates of each image of the set of images; and expanding each image region in the combined image by a set amount such that a respective border of each image region overlaps each neighboring image region.

* * * * *